(12) United States Patent
Chen

(10) Patent No.: US 11,902,378 B2
(45) Date of Patent: Feb. 13, 2024

(54) SYSTEMS AND METHODS FOR DATA SYNCHRONIZATION

(71) Applicant: BEIJING DIDI INFINITY TECHNOLOGY AND DEVELOPMENT CO., LTD., Beijing (CN)

(72) Inventor: Gong Chen, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/662,837

(22) Filed: May 10, 2022

(65) Prior Publication Data
US 2022/0321666 A1 Oct. 6, 2022

Related U.S. Application Data

(63) Continuation of application No. PCT/CN2020/124262, filed on Oct. 28, 2020.

(30) Foreign Application Priority Data

Nov. 11, 2019 (CN) .......................... 201911095346.3
Nov. 11, 2019 (CN) .......................... 201921933373.9

(51) Int. Cl.
*H04L 12/70* (2013.01)
*H04L 67/133* (2022.01)
(Continued)

(52) U.S. Cl.
CPC .......... *H04L 67/133* (2022.05); *H04L 7/0041* (2013.01); *H04L 67/12* (2013.01)

(58) Field of Classification Search
CPC ..... H04L 67/133; H04L 7/0041; H04L 67/12; B60R 16/02; G05B 19/04; G06F 13/16
(Continued)

(56) References Cited

U.S. PATENT DOCUMENTS

2006/0143439 A1* 6/2006 Arumugam ............ G06Q 10/08
713/153
2007/0300271 A1* 12/2007 Allen .................. H04N 21/4223
725/93
(Continued)

FOREIGN PATENT DOCUMENTS

CN 104579532 A 4/2015
CN 105676693 A 6/2016
(Continued)

OTHER PUBLICATIONS

International Search Report in PCT/CN2020/124262 dated Jan. 27, 2021, 8 pages.
(Continued)

*Primary Examiner* — Ario Etienne
*Assistant Examiner* — Elizabeth Kassa
(74) *Attorney, Agent, or Firm* — METIS IP LLC

(57) ABSTRACT

The application discloses Systems and methods for a data synchronization. The system may include a receiving module, an instruction generating module and a sending module. The receiving module may be configured to receive the first instruction. The first instruction may be used to instruct the start of data acquisition of the system. In response to receiving the first instruction, the instruction generating module may be configured to generate a second instruction. The second instruction may be used to trigger at least two sensors to acquire data. The sending module may be configured to send second instruction to at least two sensors respectively based on the first delay. The first delay causes (Continued)

the time difference between at least two sensors starting to acquire data less than the first preset threshold.

17 Claims, 18 Drawing Sheets

(51) Int. Cl.
*H04L 7/00* (2006.01)
*H04L 67/12* (2022.01)

(58) Field of Classification Search
USPC .......................................................... 709/224
See application file for complete search history.

(56) References Cited

U.S. PATENT DOCUMENTS

| | | | |
|---|---|---|---|
| 2012/0179067 A1* | 7/2012 | Wekell ................ | A61B 5/6831 |
| | | | 600/587 |
| 2014/0160291 A1 | 6/2014 | Schaffner | |
| 2015/0185054 A1 | 7/2015 | Hesch et al. | |
| 2018/0088584 A1 | 3/2018 | Tascione et al. | |
| 2019/0007912 A1* | 1/2019 | Do ..................... | H04W 64/003 |
| 2019/0123986 A1* | 4/2019 | Igarashi ............. | G05B 19/4183 |
| 2019/0286857 A1* | 9/2019 | Kataoka .................. | H04Q 9/00 |
| 2020/0019517 A1* | 1/2020 | Chazot .................... | G06F 3/038 |
| 2020/0107524 A1* | 4/2020 | Messana ................ | A01K 61/10 |
| 2020/0359312 A1* | 11/2020 | Mirfakhraei ...... | H04W 52/0216 |
| 2021/0354719 A1* | 11/2021 | Wang ................... | G06V 20/588 |
| 2022/0191469 A1* | 6/2022 | Haskin ................ | H04N 17/002 |

FOREIGN PATENT DOCUMENTS

| | | |
|---|---|---|
| CN | 107172320 A | 9/2017 |
| CN | 108645402 A | 10/2018 |
| CN | 108988974 A | 12/2018 |
| CN | 110139041 A | 8/2019 |
| CN | 209297128 U | 8/2019 |
| CN | 110329273 A | 10/2019 |
| CN | 110398230 A | 11/2019 |
| CN | 211308445 U | 8/2020 |
| CN | 111813716 A | 10/2020 |
| EP | 1575058 A1 | 9/2005 |

OTHER PUBLICATIONS

Written Opinion in PCT/CN2020/124262 dated Jan. 28, 2021, 10 pages.
First Office Action in Chinese Application No. 201911095346.3 dated Sep. 3, 2021, 14 pages.

* cited by examiner

SYSTEMS AND METHODS FOR DATA SYNCHRONIZATION

CROSS-REFERENCE TO RELATED APPLICATIONS

This application is a continuation of International Application No. PCT/CN2020/124262, filed on Oct. 28, 2020, which claims priority to Chinese Patent Application No. 201911095346.3 filed on Nov. 11, 2019, Chinese Patent Application No. 201921933373.9 filed on Nov. 11, 2019, the entire contents of each of which are hereby incorporated by reference.

TECHNICAL FIELD

This application relates to data acquisition, and more specifically, relates to a system and method for synchronizing at least two sensors.

BACKGROUND

With the development of information technology, various needs based on the positioning are emerging, and the need for high-precision maps is becoming more and more urgent. The acquisition of a high-precision map needs to integrate data acquired by multiple sensors such as an inertial measurement unit (IMU), a global positioning system (GPS) receiver, and a camera. In order to fuse the data acquired by multiple sensors, when multiple sensors acquire data synchronously, an error between the sampling times of the multiple sensors shall not be greater than 1 millisecond. Therefore, it is desirable to provide a data synchronization system and method, which can realize the accurate fusion of sampling data of multiple sensors such as an inertial measurement unit, a global positioning system, and a camera.

SUMMARY

An aspect of the present disclosure provides a data synchronization system. The system may include a receiving module, an instruction generating module and a sending module. The receiving module may be configured to receive the first instruction. The first instruction may be used to instruct the start of data acquisition of the system. In response to receiving the first instruction, the instruction generating module may be configured to generate a second instruction. The second instruction may be used to trigger the at least two sensors to acquire data. The sending module may be configured to send the second instruction to the at least two sensors respectively based on the first delay. The first delay may a time difference between the at least two sensors starting to acquire data less than the first preset threshold.

In some embodiments, the sending module may include a first frequency generator. The first frequency generator may be used to instruct the sending module to send the second instruction based on a first frequency.

In some embodiments, the at least two sensors may include a first sensor and a second sensor. To send the second instruction to the at least two sensors respectively based on the first delay, the sending module may be further configured to send a first acquisition instruction to the first sensor, and after the first delay, send a second acquisition instruction to the second sensor. The first acquisition instruction may be used to trigger the first sensor to acquire data. The second acquisition instruction may be used to trigger the second sensor to acquire data.

In some embodiments, the at least two sensors may include a first sensor and a second sensor. To send the second instruction to the at least two sensors respectively based on the first delay, the sending module may be further configured to send a first acquisition instruction to the first sensor, and send a second acquisition instruction to the second sensor. The first acquisition instruction may be used to trigger the first sensor to acquire data. The second acquisition instruction may be used to trigger the second sensor to acquire data, the second acquisition instruction including the first delay.

In some embodiments, to receive the first instruction, the receiving module may be further configured to receive the first instruction sent by the second sensor at a second frequency.

In some embodiments, the system further includes a processing module. In response to receiving the first instruction, the instruction generating module may be further configured to generate a third instruction. The third instruction may be used to instruct the at least two sensors to send acquired data to the processing module. The sending module may be configured to send the third instruction to the at least two sensors respectively based on a second delay. The second delay may cause the time difference between the at least two sensors sending the acquired data to the processing module less than a second preset threshold.

In some embodiments, to send the third instruction to the at least two sensors respectively based on the second delay, the sending module may be further configured to: in response to receiving the first instruction, send a first sending instruction to the first sensor. The first sending instruction may be used to instruct the first sensor to send acquired data to the processing module. The sending module may be further configured to: after the second delay, send a second sending instruction to the second sensor. The second sending instruction may be used to instruct the second sensor to send acquired data to the processing module.

In some embodiments, the system may further include a processing module. In response to receiving the first instruction, the instruction generating module may be further configured to generate a third instruction. The third instruction may be used to instruct the processing module to obtain the data acquired by the at least two sensors. The processing module may be configured to obtain the acquired data based on the third instruction and process the acquired data. The third instruction may include a second delay.

In some embodiments, the second instruction may include the third instruction.

In some embodiments, the first delay may be related to preparation durations of the at least two sensors to acquire data.

In some embodiments, the second delay may be related to a frequency of sending the first instruction.

In some embodiments, the at least two sensors may include an image sensor and a positioning sensor, the first delay may be determined based on a length of time between a time when the image sensor receives the first instruction and a time when the image sensor begins to acquire data. The second delay may be determined based on a length of time for the image sensor to acquire one frame of image data.

Another aspect of the present disclosure provides a data synchronization system. The system may include at least one storage device storing executable instruction, and at least one processor in communicating with the at least one storage device. Wherein when executing the executable instruction, the processor causes the system to perform operations. The operations may include: receiving a first instruction, the first instruction may be used to instruct a start of data acquisition of the system; in response to receiving the first instruction, generating a second instruction, the second instruction may be used to trigger at least two sensors to acquire data; and sending the second instruction to the at least two sensors respectively based on a first delay, the first delay causing the time difference between the at least two sensors starting to acquire data less than a first preset threshold.

Another aspect of the present disclosure provides a data synchronization method. The method may include: receiving a first instruction, the first instruction may be used to instruct a start of data acquisition of the system; in response to receiving the first instruction, generating a second instruction, the second instruction may be used to trigger at least two sensors to acquire data; and sending the second instruction to the at least two sensors respectively based on a first delay, the first delay causing the time difference between the at least two sensors starting to acquire data less than a first preset threshold.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
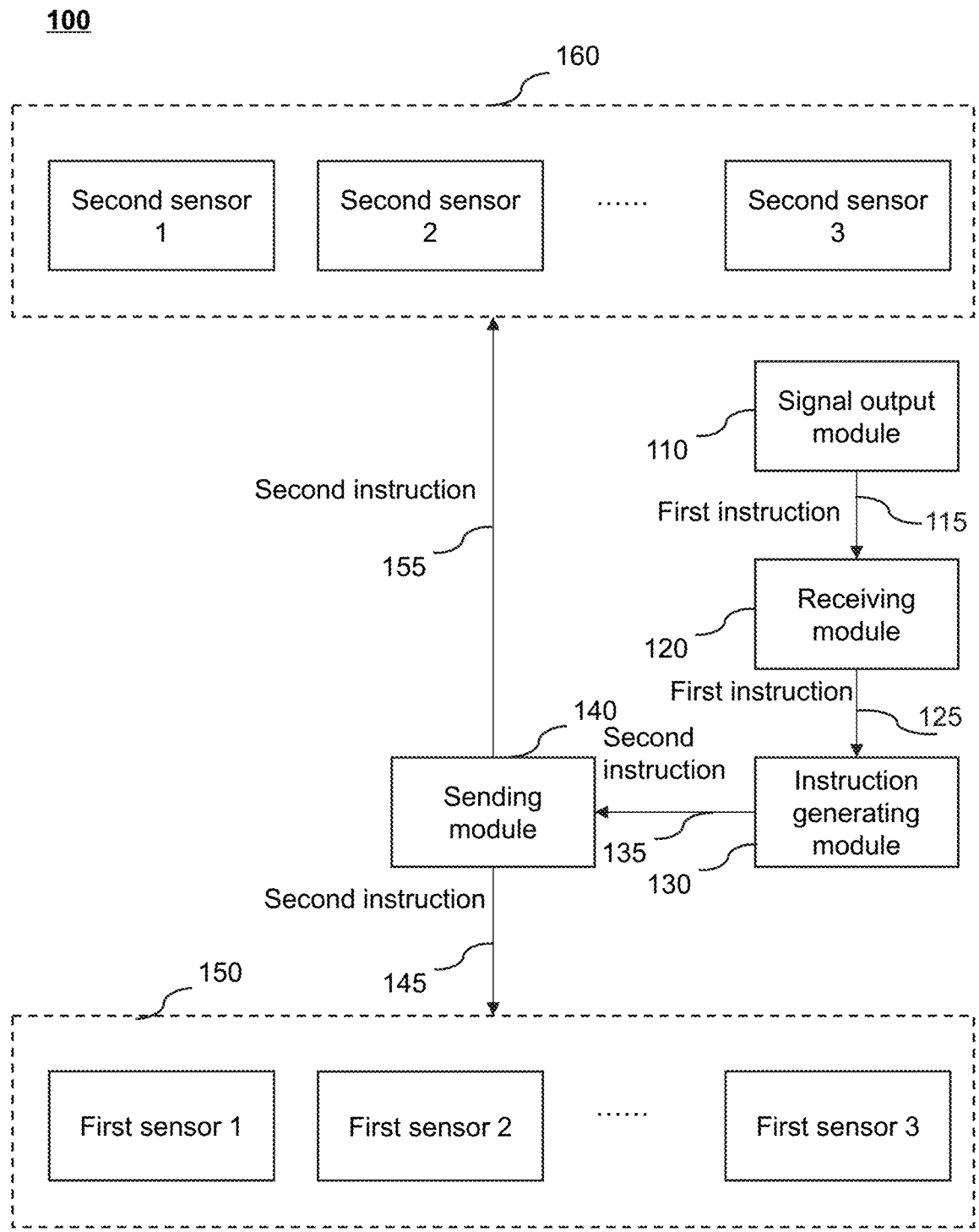
FIG. 1 is a schematic diagram illustrating an exemplary data synchronization system according to some embodiments of the present disclosure.

In order to illustrate technical solutions related to embodiments of the present disclosure, a brief introduction of the drawings referred to the description of the embodiments is provided below. Obviously, the drawings described below are only some examples or embodiments of the present disclosure. A person of ordinary skill in the art, without further creative effort, may apply the present disclosure in other scenarios according to these drawings. Unless the context clearly indicates or stated otherwise, the same reference numerals in the drawings refer to the same structure or operation.

It should be understood that the "system", "device", "unit" and/or "module" used in this application is a method for distinguishing different components, elements, components, parts or assemblies at different levels. However, if other words can achieve the same purpose, they can be replaced by other expressions.

As used in the disclosure and the claims, the singular forms "a", "an", "one", and "the" may be intended to include the plural forms as well, unless the context clearly indicates otherwise. Generally, the terms "include" and/or "comprise" specify the presence of operations and elements, but do not form an exclusive combination, the methods and devices may include other operations and elements.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts, or one or more operations may be omitted from the flowcharts.

In some scenarios, it is necessary to synchronize the data acquisition of at least two sensors. For example, when acquiring high-precision maps, it is necessary to realize the data acquisition synchronization of multiple sensors such as an IMU, a GPS, and a camera. However, due to the inherent delay of image data acquisition by the camera, it is difficult to realize the data acquisition synchronization of multiple sensors such as the IMU, the GPS, and the camera. The present disclosure provides systems and methods for data synchronization. A system may include a receiving module, an instruction generating module, and a sending module. The receiving module may be configured to receive a first instruction. The first instruction may be used to instruct the start of data acquisition of the data synchronization system. In response to receiving the first instruction, the instruction generating module may be configured to generate a second instruction. The second instruction may be used to trigger the at least two sensors to acquire data. The sending module may be configured to send the second instruction to the at least two sensors respectively based on the first delay. The first delay may cause the time difference between the at least two sensors starting to acquire data less than the first preset threshold. In this disclosure, it should be noted that the term "synchronization" means that the time difference between at least two sensors starting to acquire data is less than a certain time threshold, for example, 0.1 milliseconds, 1 millisecond, 10 milliseconds, etc.

FIG. 1 is a schematic diagram illustrating an exemplary data synchronization system 100 according to some embodiments of the present disclosure. As shown in FIG. 1, the data synchronization system 100 may include a signal output module 110, a receiving module 120, an instruction generating module 130, and a sending module 140. The various components in the data synchronization system 100 may be connected and/or communicated with each other directly or via a wireless connection, a wired connection, or a combination thereof. For example, the signal output module 110 may connect and/or communicate with the receiving module 120 through a wired connection or a wireless connection. As another example, the receiving module 120 may connect and/or communicate with the instruction generating module 130 through a wired connection or wireless connection. The wired connection may be realized by, for example, wire (e.g., telephone line), optical cable (e.g., optical fiber), USB interface, etc., or any combination thereof. Merely by way of example, the wireless connection may include a wireless protocol (e.g., an 802.11 agreement, a Wi-Fi network, a WiMAX, etc.), a radio, a wireless local area network (WLAN), a Bluetooth™ network, a Zigbee™ network, a near field communication (NFC), a mobile communication technology (e.g., 2G, 3G, 4G, 5G, etc.) Or any combination thereof.

The signal output module 110 may be configured to generate and send a first instruction (or signal). For example, the signal output module 110 may send the first instruction to the receiving module 120. The first instruction may be used to instruct the start of data acquisition of the data synchronization system. The first instruction may be sent in a variety of forms. In some embodiments, the first instruction may be sent in the form of interrupt, called, automatic timing, or execution according to preset conditions. For example, when the first instruction is sent in the form of an interrupt, the first instruction may also be referred to as an interrupt signal, and the signal output module 110 may send an interrupt signal to the receiving module 120. As another example, when the first instruction is sent in the called form, the first instruction may be generated and stored by the signal output module 110, and then the receiving module 120 may call the first instruction from the signal output module 110. As still another example, when the first instruction is sent in the form of automatic timing, the signal output module 110 may send the first instruction to the receiving module 120 every preset period. As still another example, when the first instruction is sent in the form of execution according to preset conditions, the signal output module 110 may send the first instruction to the receiving module 120 according to the preset conditions (such as data received by the processing device 210). In some embodiments, the first instruction may include sensor information. The sensor information may be used to instruct the sensors participating in the data synchronization process. For example, the sensor information may be used to specify that the first sensor 150 and the second sensor 160 participate in the data synchronization process. In some embodiments, the first instruction may include frequency information for sending the first instruction. The frequency information may be used to specify the data acquisition frequency of the sensors participating in the data synchronization process.

In some embodiments, the signal output module 110 may be a third-party device independent of the data synchronization system 100. For example, the signal output module 110 may be a user terminal used by a user, such as a smart device, e.g., a mobile phone, a computer, etc. In some embodiments, the signal output module 110 may be integrated into any of at least two sensors. For example, the signal output module 110 may be integrated into the second sensor 160. In this case, the second sensor 160 may be a sensor capable of generating a frequency signal. For example, the second sensor 160 may be a sensor including a frequency generator. The frequency generator may send the first instruction to the receiving module 120 at a preset frequency (also referred to as a second frequency).

The receiving module 120 may be configured to receive the first instruction and send the first instruction to the instruction generating module 130. In some embodiments, the receiving module 120 may be integrated into the instruction generating module 130.

In response to receiving the first instruction, the instruction generating module 130 may be configured to generate a second instruction and send the second instruction to the sending module 140. The second instruction may be used to instruct at least two sensors (e.g., the first sensor 150 and the second sensor 160) to acquire data. In some embodiments, the count of instruction generating modules may be one or more. For example, the count of instruction generating modules may be one, and the one single instruction generating module may correspond to the at least two sensors. As another example, the count of instruction generating modules may be more than one, and each instruction generating module may correspond to at least one of the at least two sensors.

At least two sensors may include an image sensor (or referred to as a camera sensor), a positioning sensor, etc. The duration (or time) of data acquisition of at least two sensors may be different. For example, the at least two sensors may include a first sensor 150 and a second sensor 160. In some embodiments, the first sensor 150 may need a longer duration to acquire data than the second sensor 160. The duration of data acquisition may include the preparation duration before data acquisition, the duration of data acquisition and/or the total duration of data acquisition (i.e. The sum of preparation duration and acquisition duration). As used herein, the acquisition preparation duration refers to the length of time between the sensor receiving the data acquisition instruction and starting to acquire data. The duration of data acquisition refers to the length of time required for the sensor to acquire a certain amount of data (for example, one frame of data) after it is ready. The duration for the first sensor 150 to acquire data may be longer than the duration for the second sensor 160 to acquire data. For example, the preparation duration before the first sensor 150 acquires data and/or the duration for the first sensor 150 acquires data may be longer than the preparation duration before the second sensor 160 acquires data and/or the duration for the second sensor 160 acquiring data, respectively. As a further example, the first sensor 150 may be an image sensor. The image sensor may include a camera (video camera or webcam), an intelligent device with an imaging device (such as a mobile phone, a computer), or a combination thereof. The second sensor 160 may be a positioning sensor. The positioning sensor may include an independent satellite positioning module, a handheld satellite positioning device, a smartphone with a positioning function, a radar, etc., or a combination thereof. In some embodiments, the first sensor 150 may be an image sensor (e.g., a camera), and the second sensor 160 may be an IMU/GPS integrated device. In some embodiments, the first sensor 150 may include a plurality of first sensors, such as the first sensor 1, the first sensor 2, the first sensor 3, or the like. The second sensor 160 may include a plurality of second sensors, such as a second sensor 1, a second sensor 2, a second sensor 3, or the like.

After receiving the second instruction, the sending module 140 may be configured to send one or more second instructions to at least two sensors (e.g., the first sensor 150 and the second sensor 160) respectively based on a first delay. In some embodiments, the sending module 140 may send the one or more second instructions at a preset frequency (i.e., a first frequency). Merely by way of example, the sending module 140 may include a frequency generator (e.g., a first frequency generator). The frequency generator may be used to instruct the sending module 140 to send a second instruction at a preset frequency (i.e., the first frequency). Specifically, the sending module 140 may send the second instruction periodically at the first frequency corresponding to the first frequency generator. For example, assuming that the first frequency is 10 Hz, the sending module 140 may send the second instruction every 100 milliseconds. The first frequency may be used to determine the frequency of sensor data acquisition. The setting of the first frequency generator may enable the data synchronization system 100 to perform multiple synchronous data acquisition after receiving the first instruction. The value of the first frequency may ensure that at least two sensors may complete a data acquisition within the time of data acquisition range determined by the first frequency (e.g., 10 Hz) (e.g., 100 milliseconds). For example, if the time of data acquisition of a sensor with the longest time of data acquisition among the at least two sensors is 100 milliseconds, the first frequency may be less than or equal to 10 Hz. As another example, when the first sensor 150 is a camera and the time for the camera acquiring one frame of data is 100 milliseconds, and the second sensor 160 is an IMU/GPS integrated device and data solution time of the IMU/GPS integrated device is 75 milliseconds, the first frequency may be less than or equal to 10 Hz.

In some embodiments, the second instruction may include a first acquisition instruction, a second acquisition instruction, and a first delay. The first acquisition instruction may be used to instruct the first sensor 150 to acquire data. The sending module 140 may send the first acquisition instruction to the first sensor 150 to instruct the first sensor 150 to acquire data. For example, the sending module 140 may send one or more first acquisition instructions to the first sensor 150 at a first frequency. The second acquisition instruction may be used to instruct the second sensor 160 to acquire data. In some embodiments, after the first delay, the sending module 140 may send a second acquisition instruction to the second sensor 160 to instruct the second sensor 160 to acquire data. For example, the sending module 140 may send one or more second acquisition instructions to the second sensor 160 at a first frequency.

In some embodiments, the first delay may be included in the second acquisition instruction. The sending module 140 may send the first acquisition instruction to the first sensor 150 and the second acquisition instruction to the second sensor 160 at the same time. The first sensor 150 starts data acquisition after receiving the first acquisition instruction, and the second sensor 160 may obtain the first delay included in the second acquisition instruction after receiving the second acquisition instruction and start data acquisition after the first delay.

The first delay may be related to the acquisition preparation durations of at least two sensors (e.g., the first sensor 150 and the second sensor 160). For example, the first delay may be determined based on the maximum acquisition preparation durations of at least two sensors. As another example, if the maximum acquisition preparation duration among the acquisition preparation durations of the at least two sensors is 50 milliseconds, the first delay may be 50 milliseconds. Merely by way of example, the first delay may be related to the acquisition preparation duration of the first sensor 150. For example, the first delay may be determined based on the length of time between the first sensor 150 receiving the first instruction and the first sensor 150 starting to acquire data. As another example, when the first sensor 150 is an image sensor and the second sensor 160 is an IMU/GPS integrated device, the first delay may be the inherent delay of the image sensor. The inherent delay may refer to the time between the image sensor receiving the interrupt signal and starting to acquire the image frame (for example, T2+T3 shown in FIG. 10).

The first delay may make the time difference between at least two sensors starting to acquire data less than a first preset threshold. The first preset threshold may be the default setting of the data synchronization system 100, for example, 0 milliseconds, 0.1 milliseconds, etc. The first delay may enable the data synchronization system 100 to overcome the inherent delay of at least two sensors (e.g., the inherent delay of image sensors), to realize the synchronous data acquisition by at least two sensors. At the same time, sending the first instruction and the second instruction at a certain frequency periodically may eliminate the cumulative error and further improve the synchronization of data acquisition of at least two sensors.

In some embodiments, the sending module 140 may be integrated into the instruction generating module 130, and the function of the sending module 140 may be completed by the instruction generating module 130. In some embodiments, the sending module 140 may be located inside at least two sensors, and the function of the sending module 140 may be completed by the corresponding sensors.

It should be understood that the system is shown in FIG. 1, its equipment and modules can be implemented in various ways. For example, in some embodiments, the system and its devices and modules may be implemented by hardware, software, or a combination of software and hardware. The hardware part may be realized by special logic; the software part may store in memory and execute by an appropriate instruction execution system, such as a microprocessor or special design hardware. Those skilled in the art can understand that the above system can be implemented using computer executable instructions and/or control code contained in processors, such as providing such code on carrier media such as magnetic disk, CD or DVD-ROM, programmable memory such as read-only memory (firmware), or data carrier such as an optical or electronic signal carrier. The system and its devices and modules of the present disclosure can be implemented not only by hardware circuits such as VLSI or gate arrays, semiconductors such as logic chips and transistors, or programmable hardware devices such as field programmable gate arrays and programmable logic devices, but also by software executed by various types of processors, but also be implemented by a combination of the above hardware circuit and software (e.g., firmware).

It should be noted that the above description of the data synchronization system 100 and its modules is only for convenience of description and does not limit the present disclosure to the scope of the embodiments. It can be understood that after understanding the principle of the system, those skilled in the art may arbitrarily combine each module or form a subsystem to connect with other modules without departing from this principle. In some embodiments, for example, the receiving module 120, the instruction generating module 130, and the sending module 140 disclosed in FIG. 1 may be different modules in one system, or one module may realize the functions of the above two or more modules. For example, the receiving module 120, the instruction generating module 130 and the sending module 140 may be three independent modules or one module (such as the controller 610 shown in FIG. 6, the controller 710 shown in FIG. 7 and the STM32 microcontroller controller 1630 shown in FIG. 16) with the functions of the receiving module 120, the instruction generating module 130 and the sending module 140 at the same time. In some embodiments, each module may share one storage module, and each module may have its own storage module. Such deformations are within the protection scope of present disclosure.

Figure 2A:
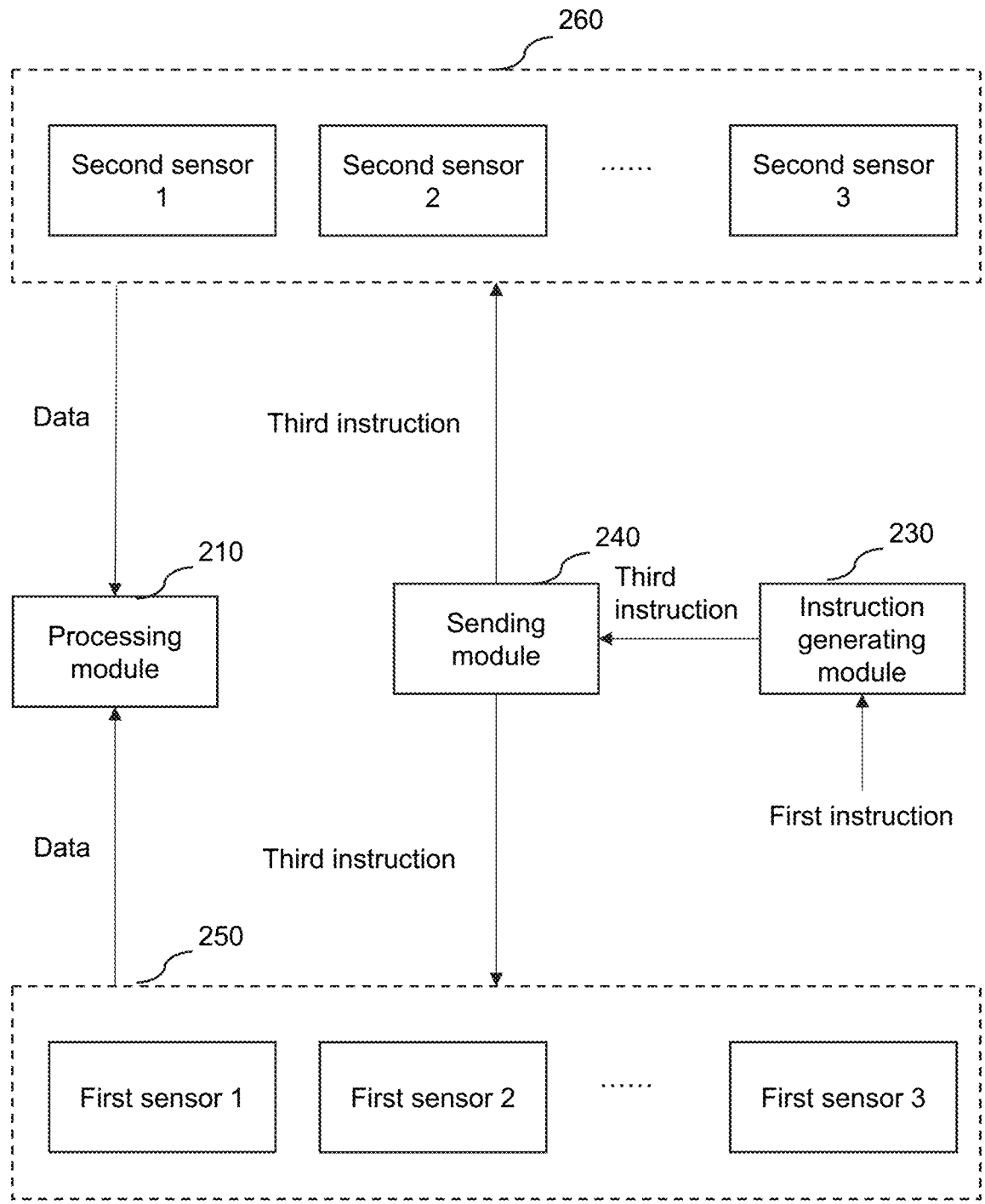
FIG. 2A is a schematic diagram illustrating an exemplary data synchronization system according to some embodiments of the present disclosure.

FIG. 2A is a schematic diagram illustrating an exemplary data synchronization system 200 according to some embodiments of the present disclosure. The data synchronization system 200 described in FIG. 2A may be the same or similar to the data synchronization system 100 in FIG. 1. For example, the data synchronization system 200 may include an instruction generating module 230 and a sending module 240. As another example, the data synchronization system 200 may include a signal output module (not shown) and a receiving module (not shown). As still another example, the signal output module may include an interrupt source (not shown) for generating an interrupt signal (i.e., the first instruction). The signal output module may be integrated with the second sensor 260. As still another example, the instruction generating module 230 may generate the second instruction for instructing the first sensor 250 and the second sensor 260 to acquire data. The second instruction may include a first acquisition instruction, a second acquisition instruction, and a first delay. The first acquisition instruction may be used to instruct the first sensor 250 to acquire data. The sending module 240 may send a first acquisition instruction to the first sensor 250 to instruct the first sensor 250 to acquire data. In some embodiments, after the first delay, the sending module 240 may send the second acquisition instruction to the second sensor 260 to instruct the second sensor 260 to acquire data. More description of the second instruction may be described with reference to FIG. 1.

As shown in FIG. 2A, the data synchronization system 200 may further include a processing module 210.

The processing module 210 may be configured to process information. The processing module 210 and various components in the data synchronization system 200 (e.g., instruction generating module 230, sending module 240) may be connected and/or communicated with each other directly or via a wireless connection, a wired connection, or a combination thereof.

As shown in FIG. 2A, in response to receiving the first instruction, the instruction generating module 230 may be further configured to generate a third instruction and send the third instruction to the sending module 240. The third instruction may be used to instruct at least two sensors (e.g., the first sensor 250 and the second sensor 260) to send the acquired data to the processing module 210. For example, when the first sensor 250 is an image sensor and the second sensor 260 is an IMU/GPS integrated device, the third instruction may be used to instruct the image sensor and the IMU/GPS integrated device to send the acquired data to the processing device 210. After receiving the third instruction, the sending module 240 may be configured to send the third instruction to at least two sensors respectively based on the second delay. The second delay may cause the time difference between the at least two sensors sending the acquired data to the processing module 210 less than the second preset threshold. The second preset threshold may be the default setting of the data synchronization system 200, for example, 0 milliseconds, 0.1 milliseconds, etc.

In some embodiments, the second delay may be related to the frequency at which the first instruction is sent, such as the second frequency, and/or the length of time for the first sensor 250 or the second sensor 260 to acquire data. For example, the second delay may be the reciprocal of the frequency at which the first instruction is sent. As another example, if the second frequency is 10 Hz, the second delay may be 100 milliseconds. Merely by way of example, when the first sensor 250 is an image sensor and the second sensor 260 is an IMU/GPS integrated device, the second delay may be determined based on the length of time for the image sensor to acquire one frame of image data (e.g., T1 shown in FIG. 10). For example, the second delay may be greater than or equal to the length of time for the image sensor to acquire one frame of image data. The second delay may enable the at least two sensors to send the acquired data synchronously.

In some embodiments, the third instruction may include a first sending instruction and a second sending instruction. The first sending instruction may be used to instruct the first sensor 250 to send the acquired data to the processing module 210. The second sending instruction may be used to instruct the second sensor 260 to send the acquired data to the processing module 210. In response to receiving the third instruction, the sending module 240 may send the first sending instruction to the first sensor 250 to instruct the first sensor 250 to send the acquired data to the processing module 210 after acquiring the data. After the second delay, the sending module 240 may send the second sending instruction to the second sensor 260 to instruct the second sensor 160 to send the acquired data to the processing module 210.

In some embodiments, the second sending instruction may include the second delay. In response to receiving the third instruction, the sending module 240 may simultaneously send the first sending instruction to the first sensor 250 and the second sending instruction to the second sensor 260. The first sending instruction may instruct the first sensor 250 to send the acquired data to the processing module 210 after acquiring the data. After receiving the second sending instruction, the second sensor 260 may obtain the second delay included in the second sending instruction. After the second delay included in the second sending instruction, the second sensor 260 may send the acquired data to the processing module 210.

In some embodiments, the third instruction may include the second delay. The sending module 240 may send the third instruction to the first sensor 250 and the second sensor 260, respectively. After receiving the second sending instruction, the first sensor 250 may obtain the second delay included in the third instruction. After the second delay, the first sensor 250 may send the acquired data to the processing module 210, and simultaneously the second sensor 260 may send the collected data to the processing module 210.

In some embodiments, the second instruction may include the third instruction. The second instruction may instruct the first sensor 250 and the second sensor 260 to start data acquisition and simultaneously instruct. After receiving the second instruction, the first sensor 250 and the second sensor 260 may obtain the third instruction included in the second instruction. After the second delay after receiving the second instruction, the first sensor 250 and the second sensor 260 may send the acquired data to the processing module 210.

In some embodiments, the at least two sensors may instruct the signal output module to generate and send the next first instruction while sending the acquired data to the processing module 210. For example, when the signal output module is a third-party device independent of the data synchronization system (e.g., 100, 200), the at least two sensors may send an instruction signal to the signal output module to instruct the signal output module to generate and send the next first instruction. As another example, when the signal output module is integrated into the second sensor 160, the second sensor 160 may directly instruct the signal output module to generate and send the next first instruction. As still another example, when the first sensor 250 is an image sensor and the second sensor 260 is an IMU/GPS integrated device, the IMU/GPS integrated device may instruct the signal output module integrated into the IMU/GPS integrated device to generate and send the next first instruction while sending the solved data to the processing module 210.

Figure 2B:
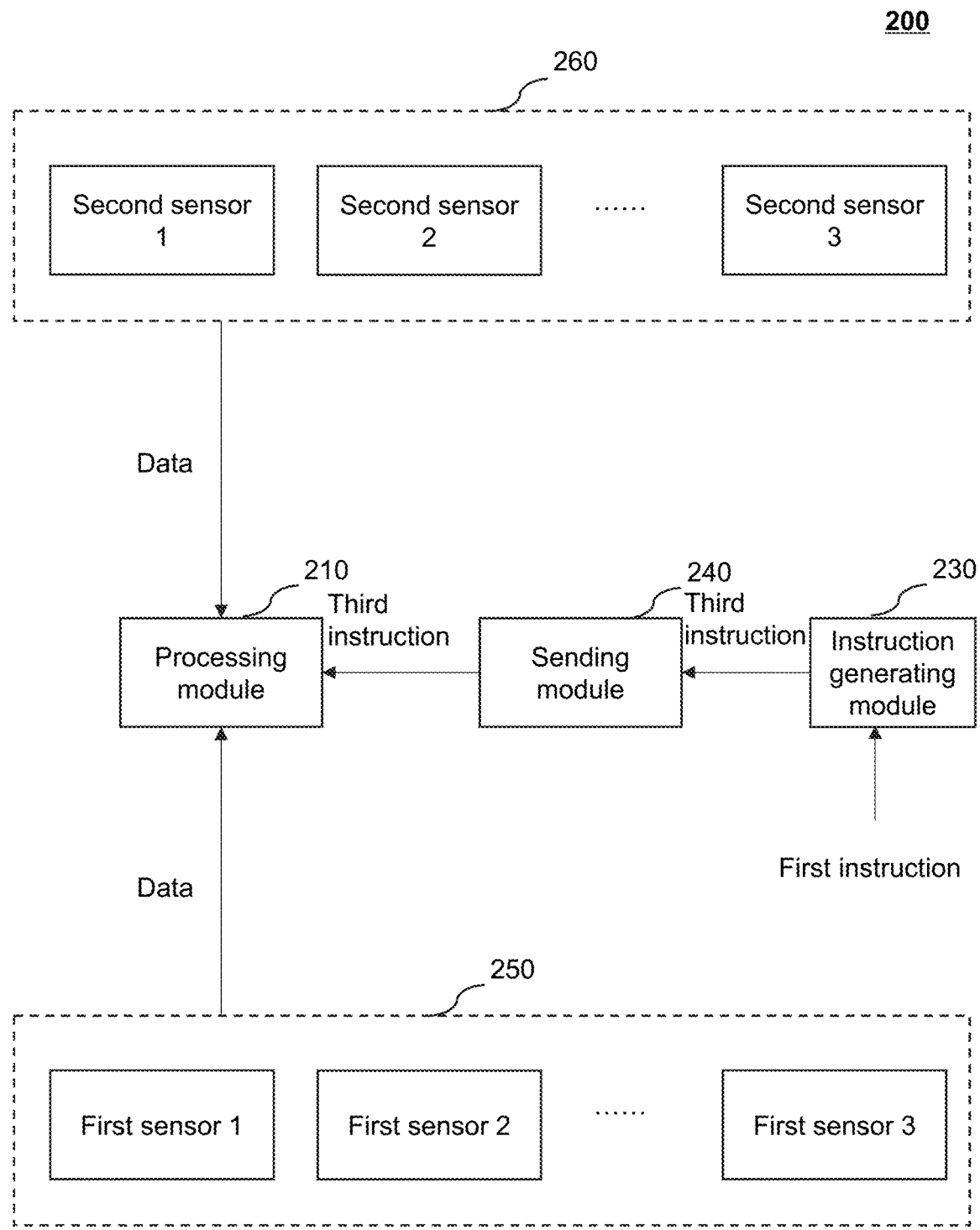
FIG. 2B is a schematic diagram illustrating an exemplary data synchronization system according to some embodiments of the present disclosure.

FIG. 2B is a schematic diagram illustrating an exemplary data synchronization system 200 according to some embodiments of the present disclosure. As shown in FIG. 2B, in response to receiving the first instruction, the instruction generating module 230 may be further configured to generate a third instruction. The third instruction may be used to instruct the processing module 210 to acquire data acquired by at least two sensors (e.g., the first sensor 250 and the second sensor 260). The instruction generating module 230 may send the third instruction to the sending module 240. The sending module 240 may further send the third instruction to the processing module 210. The processing module 210 may be configured to receive the acquired data based on the third instruction. Specifically, the third instruction may include a second delay, and in response to receiving the third instruction, the processing module 210 may obtain the acquired data from the first sensor 250 and acquire data from the second sensor 260 after the second delay.

Further, the processing module 210 may be configured to process the acquired data. In some embodiments, after receiving the acquired data from the first sensor 250 and the second sensor 260, the processing module 210 may fuse the acquired data. The processing module 210 may fuse the acquired data using a fusion algorithm. The fusion algorithm may include a weighted average algorithm, a Kalman filter algorithm, a multi Bayesian estimation algorithm, a Dempster-Shafer (D-S) evidence reasoning algorithm, production rules, a fuzzy logic theory, a neural network, a rough set theory, an expert system, etc., or any combination thereof.

In some embodiments, the signal output module (not shown), the receiving module (not shown), the instruction generating module 230, the sending module 240, and the processing module 210 may be integrated into one processing device. The processing device may include at least one hardware processor, such as a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a microcontroller unit, and a digital signal processor (DSP), a field programmable gate array (FPGA), high-order RISC machine (ARM), a programmable logic device (PLD), any circuit or processor or the like capable of performing at least one function, or any combination thereof. The processing device may perform the functions of the signal output module, the receiving module, the instruction generating module 230, the sending module 240, and the processing module 210. For example, the processing device may receive the first instruction. In response to receiving the first instruction, the processing device may send the second instruction to each of the at least two sensors based on the first delay. As another example, the processing device may generate a third instruction and send the third instruction to at least two sensors respectively based on the second delay. As another example, the processing device may generate the third instruction and receive data acquired by at least two sensors based on the third instruction.

It should be understood that the systems, devices, and modules shown in FIG. 2A and FIG. 2B may be implemented in various ways. For example, in some embodiments, the system and its devices and modules may be implemented by hardware, software, or a combination of software and hardware. The hardware part may be realized by special logic; the software part may be stored in memory and executed by an appropriate instruction execution system, such as a microprocessor or special design hardware. Those skilled in the art can understand that the above system may be implemented using computer executable instructions and/or control code contained in the processor, such as providing such code on carrier media such as magnetic disk, CD or DVD-ROM, programmable memory such as read only memory (Firmware), or data carrier such as an optical or electronic signal carrier. The system and its devices and modules of the present disclosure may be implemented not only by hardware circuits such as a VLSI or gate arrays, semiconductors such as logic chips and transistors, or programmable hardware devices such as field programmable gate arrays and programmable logic devices, but also by software executed by various types of processors, for example, it may also be implemented by a combination of the above hardware circuit and software (e.g., Firmware).

It should be noted that the above description of the data synchronization system 200 and its modules is only for convenience of description and does not limit the present disclosure to the scope of the embodiments. It can be understood that after understanding the principle of the system, those skilled in the art may arbitrarily combine each module or form a subsystem to connect with other modules without departing from this principle.

Figure 3:
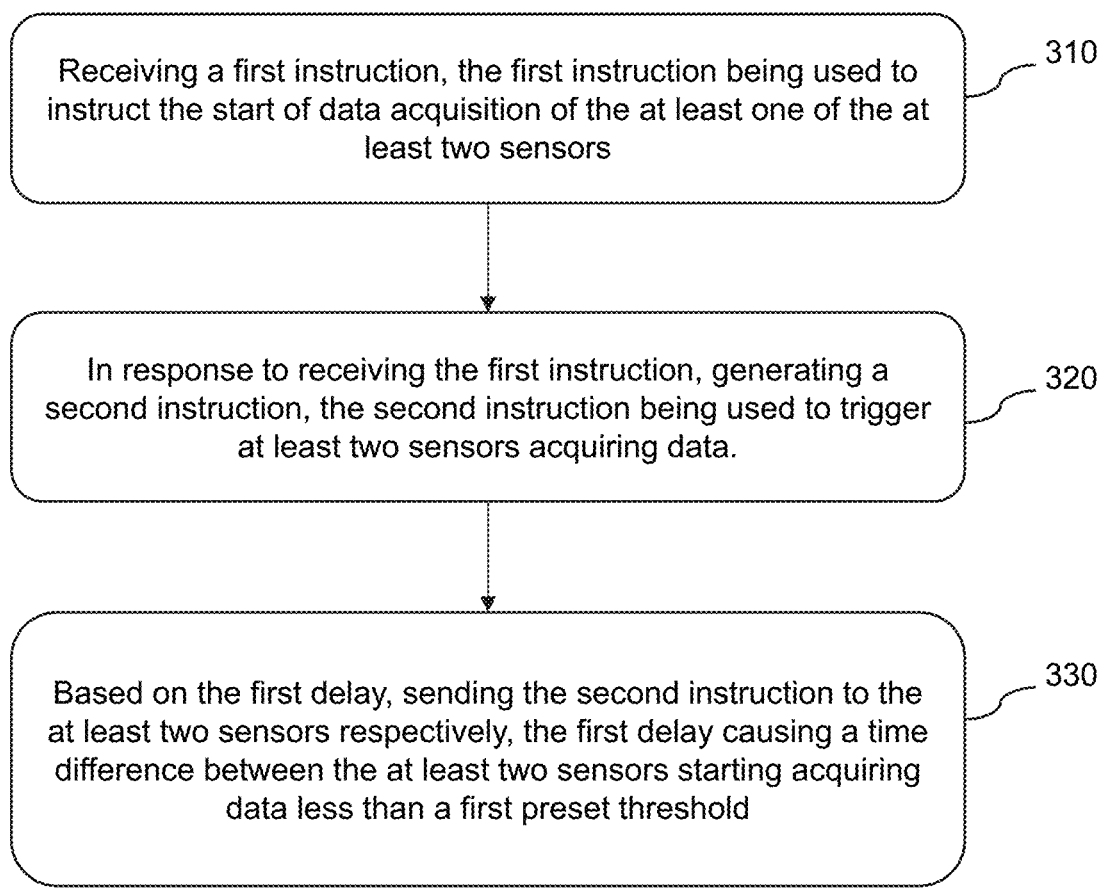
FIG. 3 is a flowchart illustrating an exemplary process for data synchronization according to some embodiments of the present disclosure.

FIG. 3 is a flowchart illustrating an exemplary process for data synchronization 300 according to some embodiments of the present disclosure. In some embodiments, the process 300 for data synchronization may be performed by a system including at least one storage device storing executable instructions and at least one processing device communicating with the at least one storage device. In some embodiments, the process 300 for data synchronization may be performed by a data synchronization system (e.g., 100, 200, 600, 700, 1600) and a data synchronization device 1100. As shown in FIG. 3, the data synchronization process 300 may include the following operations.

In 310, at least one processing device may receive a first instruction. The first instruction may be used to instruct the start of data acquisition. More description of the first instruction may be described with reference to FIG. 1.

In 320, in response to receiving the first instruction, the at least one processing device may generate a second instruction. The second instruction may be used to trigger at least two sensors to acquire data. More description of the second instruction may be described with reference to FIG. 1.

In 330, based on the first delay, the at least one processing device may send the second instruction to the at least two sensors respectively. The first delay may cause the time difference between the at least two sensors starting to acquire data less than a first preset threshold. More descriptions of the first delay may be described with reference to FIG. 1.

In some embodiments, the at least two sensors may include a first sensor and a second sensor (e.g., first sensor 150 and second sensor 160, first sensor 250 and second sensor 260). The second instruction may include a first acquisition instruction and a second acquisition instruction. In response to receiving the first instruction, at least one processing device may send the first acquisition instruction to the first sensor to instruct the first sensor to acquire data. After the first delay after receiving the first instruction, the at least one processing device may send a second acquisition instruction to the second sensor to instruct the second sensor to acquire data.

In some embodiments, at least one processing device may generate a third instruction in response to receiving the first instruction. The third instruction may be used to instruct at least two sensors to send the acquired data to at least one processing device. The at least one processing device may send the third instruction to at least two sensors respectively based on the second delay. The second delay may cause the time difference between at least two sensors sending the acquired data to at least one processing device less than a second preset threshold. Merely by way of example, the third instruction may include a first sending instruction and a second sending instruction. In response to receiving the first instruction, the at least one processing device may send the first sending instruction to the first sensor to instruct the first sensor to send the acquired data to the at least one processing device. After the second delay after receiving the first instruction, the at least one processing device may send a second sending instruction to the second sensor to instruct the second sensor to send the acquired data to the at least one processing device. In some embodiments, the third instruction may be used to instruct at least one processing device to obtain data acquired by at least two sensors. The third instruction may include a second delay. At least one processing device may receive data acquired by at least two sensors based on the third instruction and process the acquired data.

It should be noted that the above description of process 300 for data synchronization is only for example and description, and does not limit the scope of application of the present disclosure. For those skilled in the art, various amendments and changes can be made to the process 300 under the guidance of the present disclosure. However, these amendments and changes are still within the scope of the present disclosure.

Figure 4:
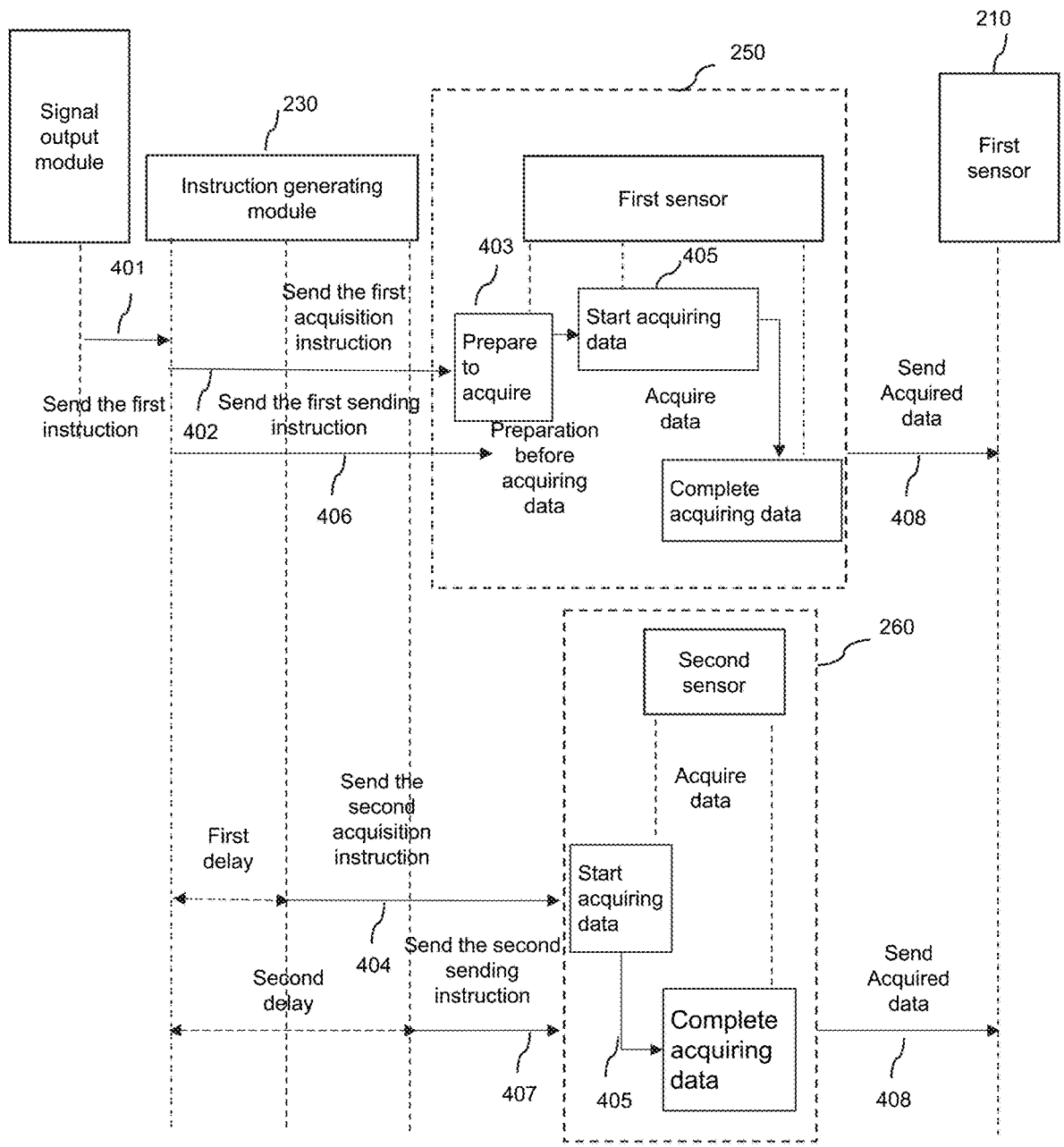
FIG. 4 is a working diagram illustrating a data synchronization system according to some embodiments of the present disclosure.

FIG. 4 is a schematic diagram illustrating the operation of the data synchronization system 200 according to some embodiments of the present disclosure. As shown in FIG. 4, in 401, the signal output module may send the first instruction to the instruction generating module 230. In 402, in response to receiving the first instruction, the instruction generating module 230 may generate and send the first acquisition instruction to the first sensor 250. In 403, after receiving the first acquisition instruction, the first sensor 250 may start the preparation before acquiring data. The duration required for preparation before data acquisition may be the first delay. In 404, after the first delay, the first sensor 250 may complete the preparation before acquiring data, and the instruction generating module 230 may generate and send the second acquisition instruction to the second sensor 260. In 405, after completing the preparation before acquiring data, the first sensor 250 may start acquiring data. At the same time, after receiving the second acquisition instruction, the second sensor 260 may start acquiring data. The first delay may cause the first sensor 250 and the second sensor 260 to acquire data synchronously.

Further, in 406, in response to receiving the first instruction, the instruction generating module 230 may generate and send the first sending instruction to the first sensor 250. In 407, after the second delay, the instruction generating module 230 may generate and send the second sending instruction to the second sensor 260. The second delay may be the total duration for the first sensor 250 to acquire data, including the duration for acquiring data and the preparation duration before acquiring data. If the first sensor 250 is an image sensor, the first delay may be the duration when the image sensor acquires one frame of image. It should be noted that the total duration for the first sensor 250 to acquire data is greater than the total duration required for the second sensor to acquire data. In 408, after receiving the first sending instruction, the first sensor 250 may send its acquired data to the processing module 210 after the data acquisition is completed, at the same time, after receiving the second sending instruction, the second sensor 260 may immediately send its acquired data to the processing module 210. The existence of the second delay solves the problem that the durations required for the first sensor 250 and the second sensor 260 to complete data acquisition are different, so that the first sensor 250 and the second sensor 260 may synchronously send data to the processing module 210.

Figure 5:
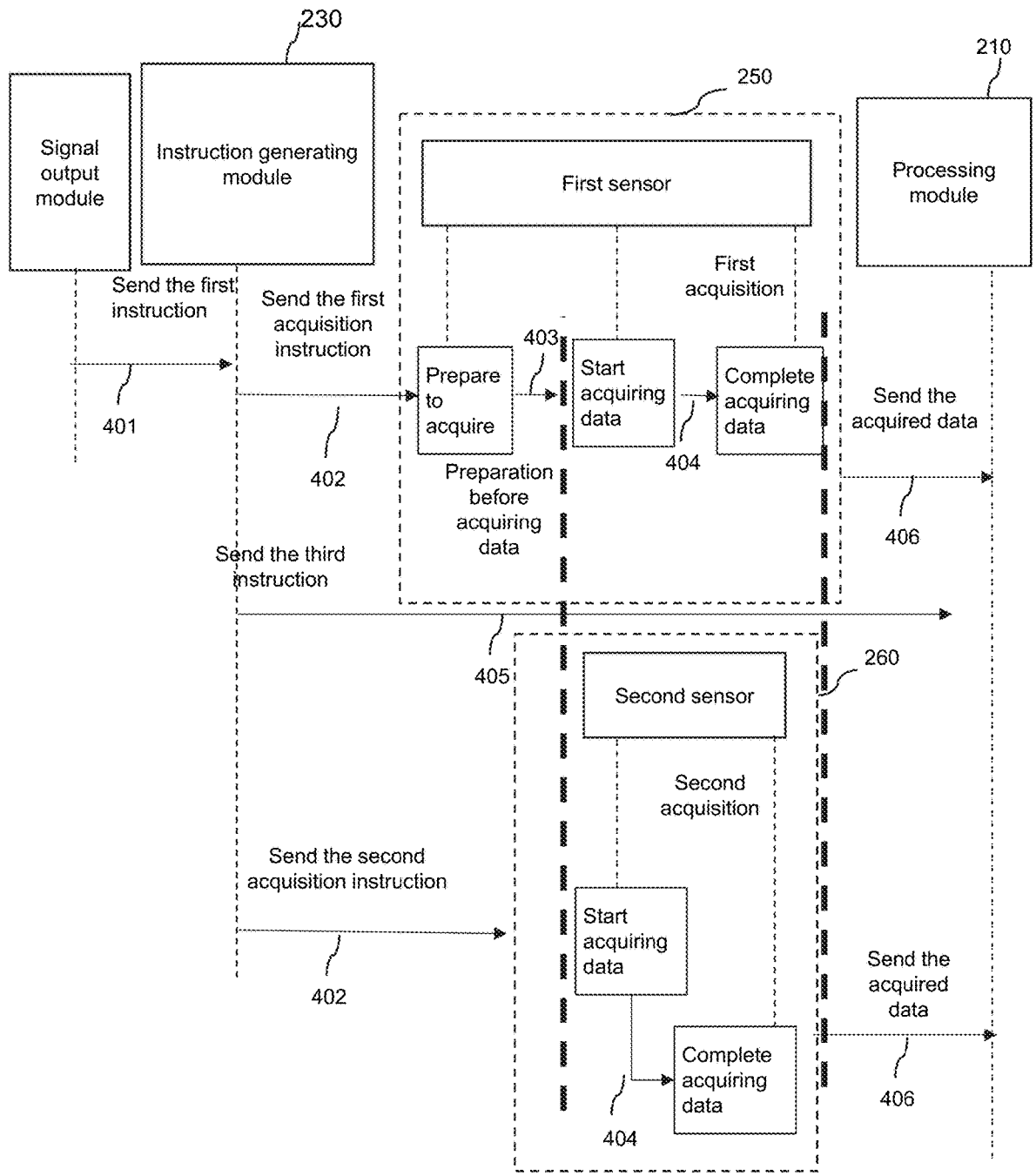
FIG. 5 is a working diagram illustrating a data synchronization system according to some embodiments of the present disclosure.

FIG. 5 is a schematic diagram illustrating the operation of the data synchronization system 200 according to some embodiments of the present disclosure. As shown in FIG. 5, in 401, the signal output module may send the first instruction to the instruction generating module 230. In 402, in response to receiving the first instruction, the instruction generating module 230 may generate and send the first acquisition instruction to the first sensor 250, and generate and send the second acquisition instruction to the second sensor 260. The second acquisition instruction may include a first delay. In 403, after receiving the first acquisition instruction, the first sensor 250 may start the preparation before acquiring data. In 404, after the first delay, the second sensor 260 may start acquiring data, and the first sensor 250 may start acquiring data. The first delay may be the duration required for preparation before the first sensor 250 acquires data. The first delay may cause the first sensor 250 and the second sensor 260 to acquire data synchronously.

Further, in 405, in response to receiving the first instruction, the instruction generating module 230 may generate and send a third instruction to the processing module 210. The third instruction may include a second delay. In 406, after receiving the third instruction, after the second delay, the processing module 210 may obtain the acquired data from the first sensor 250 and the second sensor 260 respectively. The second delay may be equal to the duration required for the first sensor 250 to complete data acquisition. In other words, the second delay may include the duration for data acquisition and the preparation duration before data acquisition. The existence of the second delay may solve the problem that the durations required for the first sensor 250 and the second sensor 260 to complete data acquisition are different so that the first sensor 250 and the second sensor 260 synchronously send data to the processing module 210.

Figure 6:
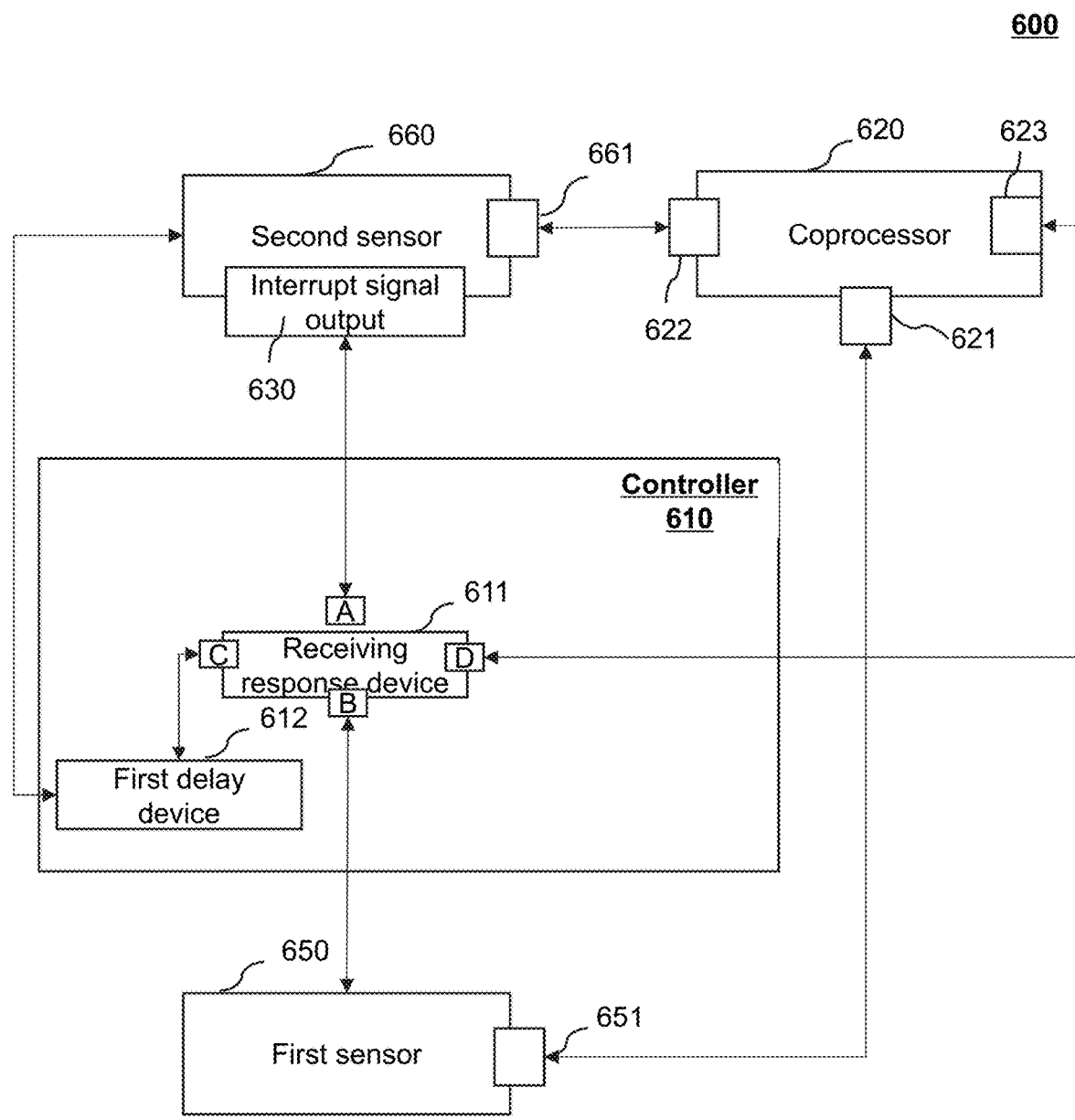
FIG. 6 is a schematic diagram illustrating an exemplary data synchronization system according to some embodiments of the present disclosure.

FIG. 6 is a schematic diagram illustrating an exemplary data synchronization system 600 according to some embodiments of the present disclosure. As shown in FIG. 6, the data synchronization system 600 includes a first sensor 650, a second sensor 660, a controller 610, a coprocessor 620, and an interrupt signal output 630. In some embodiments, the controller 610 may be an example of the receiving module 120, the instruction generating module 130 (or 230), and/or the sending module 140 (or 240). The coprocessor 620 may be an example of the processing module 210. The interrupt signal output 630 may be an example of the signal output module 110.

The data output 651 of the first sensor 650 may be communicatively connected with the first input 621 of the coprocessor 620. The data output 661 of the second sensor 660 may be communicatively connected with the second input 622 of the coprocessor 620.

The controller 610 includes a receiving response device 611 and a first delay device 612. The interrupt signal output 630 may be communicatively connected with the interrupt signal receiving terminal A of the receiving response device 611. The first output terminal B of the reception response device 611 may be connected in communication with the first sensor 650. The second output C of the reception response device 611 is connected in communication with the second sensor 660 through the first delay device 612. The third output terminal D of the reception response device 611 is connected in communication with the control terminal 623 of the coprocessor 620.

Specifically, the reception response device 611 of the controller 610 is configured to respond to the interrupt signal output by the interrupt signal output 630, send a first acquisition signal to the first sensor 650, a second acquisition signal to the second sensor 660, and a reception fusion signal to the coprocessor 620. In some embodiments, the interrupt signal may be an example of the first instruction. The first acquisition signal may be an example of a first acquisition instruction. The second acquisition signal may be an example of a second acquisition instruction. Receiving a fusion signal may be an example of a third instruction.

Since the second acquisition signal sent to the second sensor 660 may be delayed by the first delay device 612, the second acquisition signal instructing the second sensor 660 to acquire the second acquired data may be sent to the second sensor 660 with a delay (the first delay), so that the second sensor 660 delays acquiring the second acquired data. The second sensor 660 may include various types of sensors. The first acquisition signal sent to the first sensor 650 may be sent directly without delay by the first delay device 612. Therefore, after receiving the first acquisition signal, the first sensor 650 may immediately start data acquisition preparation. After the first sensor 650 completes the data acquisition preparation, that is, after the first delay, the first sensor 650 and the second sensor 660 may start to acquire data synchronously. Thus, the delay of data acquisition (duration for data acquisition preparation) of the first sensor 650 is compensated. Finally, it is ensured that the first sensor 650 and the second sensor 660 synchronously acquire the first acquired data and the second acquired data respectively. Since the first acquired data and the second acquired data have been acquired synchronously, after receiving the fusion signal, the coprocessor 620 may directly fuse the first acquired data with the second acquired data without considering the problem of timestamp synchronization.

The first delay device 612 may be implemented using an existing delay circuit or a delay device. The present disclosure solves the problem that the sampling time of multiple sensors is not synchronized by adopting the delayed trigger for the sensor, and realizes the synchronous sampling between at least two sensors.

Figure 7:
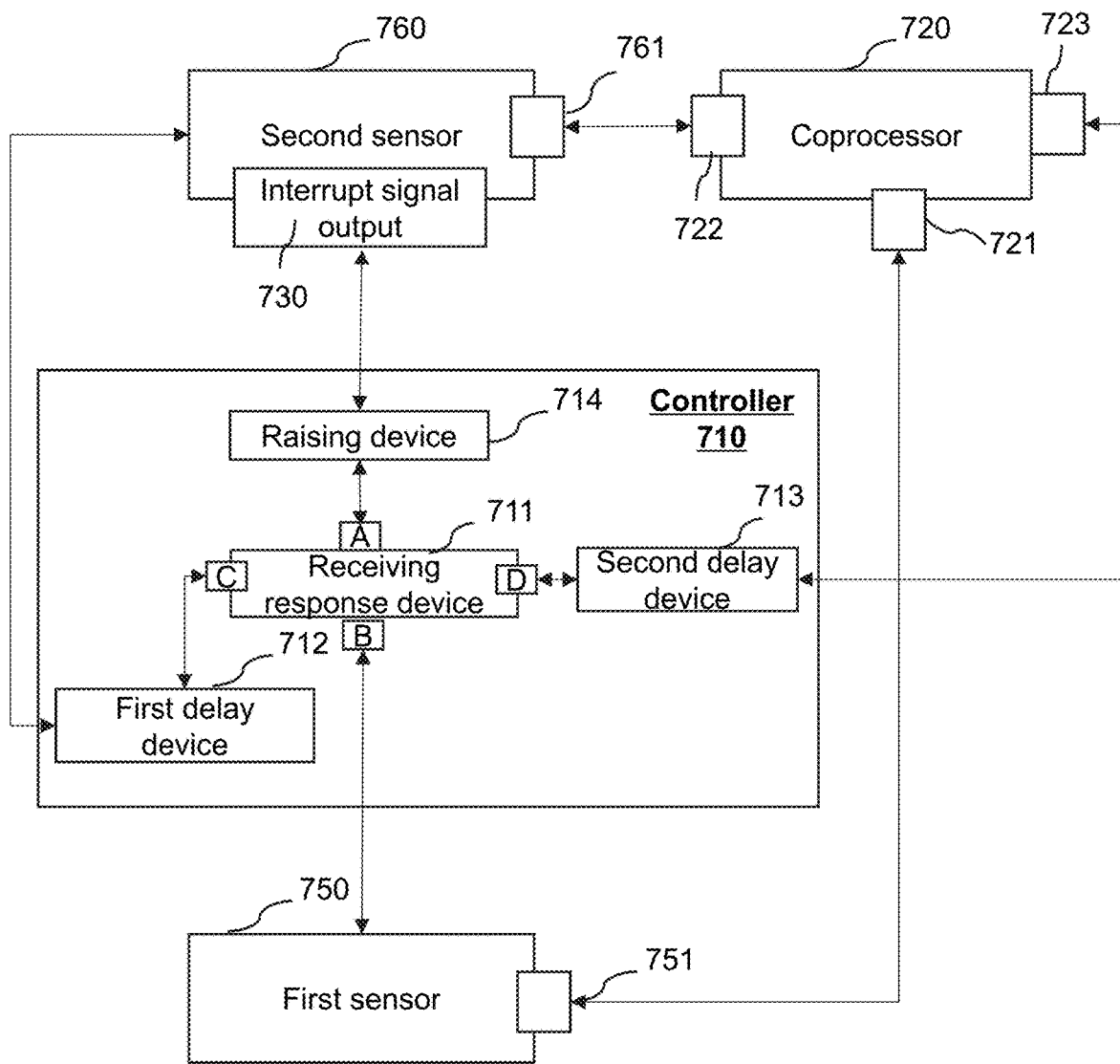
FIG. 7 is a schematic diagram illustrating an exemplary data synchronization system according to some embodiments of the present disclosure.

FIG. 7 is a schematic diagram illustrating an exemplary data synchronization system 700 according to some embodiments of the present disclosure. As shown in FIG. 7, the data synchronization system 700 includes a first sensor 750, a second sensor 760, a controller 710, a coprocessor 720, and an interrupt signal output 730. The interrupt signal output 730 may be integrated into the second sensor 760.

The data output 751 of the first sensor 750 is connected in communication with the first input 721 of the coprocessor 720. The data output 761 of the second sensor 760 is connected in communication with the second input 722 of the coprocessor 720.

The controller 710 includes a receiving response device 711, a first delay device 712, a second delay device 713, and a frequency raising device 714. The interrupt signal output 730 is connected in communication with the interrupt signal receiving terminal A of the receiving response device 711 through the frequency raising device 714. The first output terminal B of the reception response device 711 may be connected in communication with the first sensor 750. The second output C of the reception response device 711 may be connected in communication with the second sensor 760 through the first delay device 712. The third output terminal D of the reception response device 711 may be connected in communication with the control terminal 723 of the coprocessor 720 through the second delay device 713. The delay time of the first delay device 712 may be set to the first delay. The delay time of the second delay device 713 may be set to the second delay.

The first sensor 750 may be an image sensor. For example, the first sensor may be a CMOS (comprehensive metal oxide semiconductor) image sensor. The second sensor 760 may be an integrated device including an inertial measurement unit and a global positioning system. In some embodiments, the second sensor 760 may be an u-blox M8U. The controller 710 may be a microcontroller. For example, the controller 710 may be a STM32 microcontroller. The first delay device 712 and the second delay device 713 may be realized by a delay circuit. The frequency raising device 714 may be realized by a frequency adjusting device. When the controller 710 is a microcontroller, the receiving response device 711, the first delay device 712, the second delay device 713, and the frequency raising device 714 may be implemented by the logic circuit of the microcontroller.

One of the core issues of time synchronization is the alignment of samples. Alignment needs to eliminate the inherent delay of sampling by the first sensor 750 (e.g., camera) and the uncertain delay caused by software processing. If the second sensor 760 (e.g., IMU/GPS) notifies the first sensor 750 (e.g., image sensor) to sample and at the same time, the interrupt signal output 730 is notified to generate an interrupt signal and send the interrupt signal to the coprocessor 720 (e.g., CPU) for receiving image data, only one interrupt signal is received and only one frame of data is received from the perspective of software. However, due to the lack of relevant information (for example, if the image sensor includes a hardware counter, the hardware counter may be configured to correlate the time of the IMU/GPS), it is still unable to associate the image data with the IMU/GPS data. Therefore, a built-in hardware counter or the image sensor module that can fuse time information in the image may be needed, or hardware frequency rise may be needed for insufficient IMU/GPS output frequency, to eliminate the impact of software processing.

The present disclosure may apply hardware frequency rising to solve the above problems. In response to the interrupt signal, the frequency raising device 714 may send a first acquisition signal to the first sensor 750 at a preset frequency, to realize the frequency raising. By sending signals to the first sensor 750, the second sensor 760, and the coprocessor 720 at a preset frequency (i.e. at a certain interval), a plurality of synchronous first acquired data and second acquired data may be obtained between the two interrupt signals.

Figure 8:
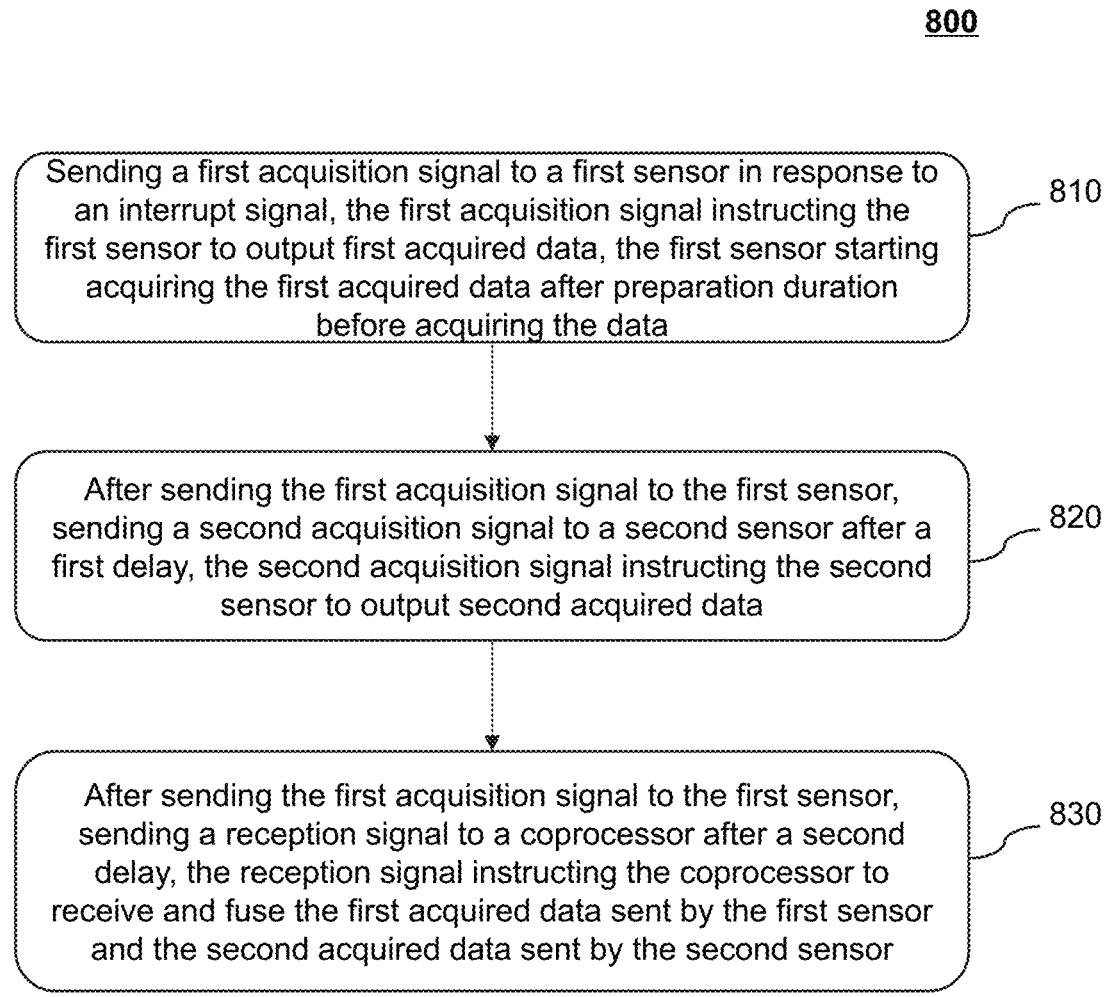
FIG. 8 is a flowchart illustrating an exemplary process for data synchronization according to some embodiments of the present disclosure.

FIG. 8 is a flowchart illustrating an exemplary process 800 for data synchronization according to some embodiments of the present disclosure. The process 800 for data synchronization may be performed by a data synchronization system (e.g., systems 100, 200, 600, 700, 1600) and a data synchronization device 1100. As shown in FIG. 8, the exemplary process for data synchronization 800 may include following operations.

In 810, a first acquisition signal may be sent to a first sensor in response to an interrupt signal. The first acquisition signal may instruct the first sensor to output the first acquired data. The first sensor may start acquiring the first acquired data after the preparation duration before acquiring the data. The preparation duration may be the inherent delay of the first sensor, such as T2+T3 in FIG. 10.

In 820, after the first acquisition signal is sent to the first sensor, a second acquisition signal may be sent to a second sensor after the first delay. The second acquisition signal may instruct the second sensor to output the second acquired data. The second sensor acquires the second acquired data in real time. The first delay may include the preparation duration before the first sensor starts acquiring data.

In 830, after the first acquisition signal is sent to the first sensor, a reception signal may be sent to a coprocessor after the second delay. The reception signal may instruct the coprocessor to receive and fuse the first acquired data sent by the first sensor and the second acquired data sent by the second sensor.

The present disclosure may be applied to the data synchronization device 1100. When receiving the interrupt signal, the data synchronization device 1100 may send a first acquisition signal to the first sensor to instruct the first sensor to acquire data. The first sensor may be various types of existing sensors. After receiving the first acquisition signal, the first sensor may start acquiring the first acquired data after the first delay. Therefore, in 820, a second acquisition signal may be sent to the second sensor after the first delay.

The second sensor may acquire the second acquired data in real time, to ensure the synchronous acquisition of the first acquisition data and the second acquired data. In 830, a reception signal may be sent to the coprocessor, since the first acquired data and the second acquired data have been acquired synchronously, the coprocessor may directly fuse the first acquired data with the second acquired data without considering the problem of timestamp synchronization. The present disclosure solves the problem that the sampling time between multiple sensors is not synchronized by adopting the delayed trigger for the sensors, and realizes the synchronous sampling between at least two sensors.

Figure 9:
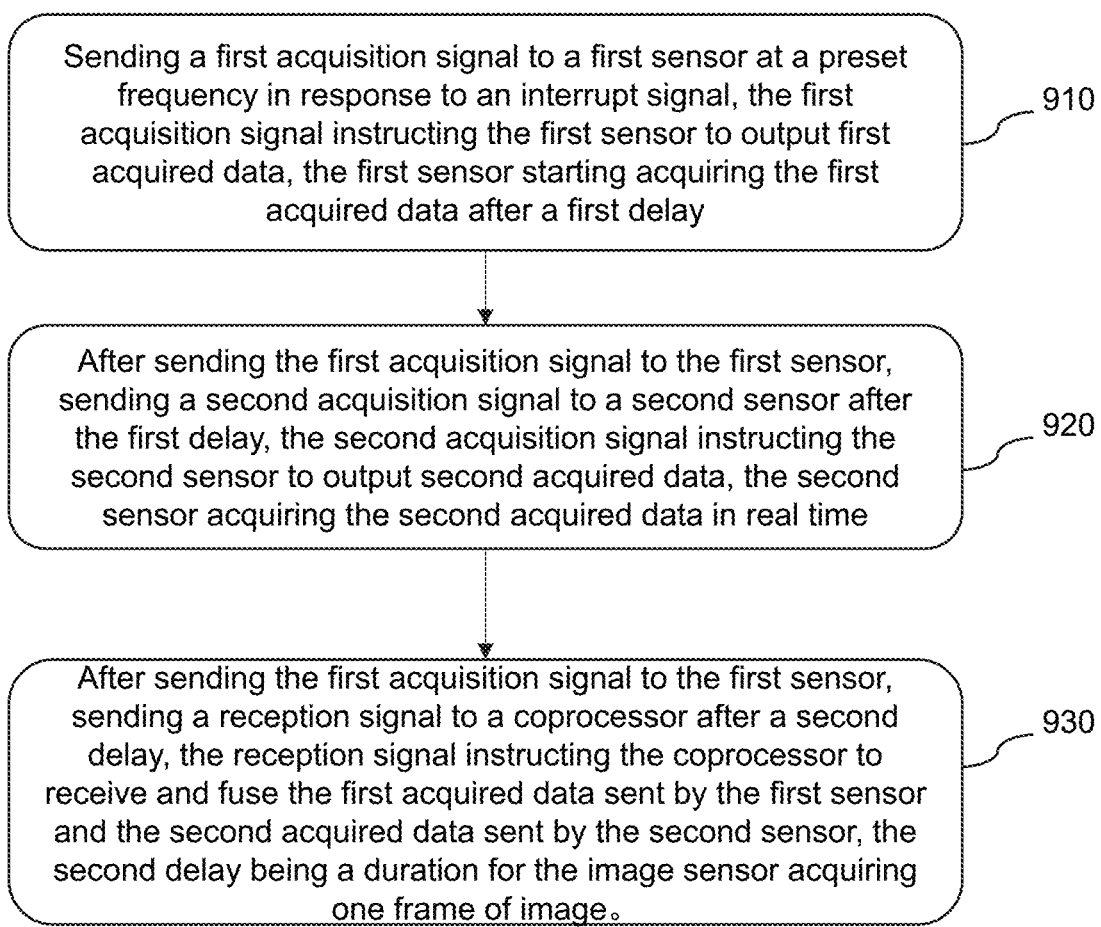
FIG. 9 is a flowchart illustrating an exemplary process for data synchronization according to some embodiments of the present disclosure.

FIG. 9 is a flowchart illustrating an exemplary process for data synchronization 900 according to some embodiments of the present disclosure. The exemplary process for data synchronization 900 may be performed by a data synchronization system (e.g., 100, 200, 600, 700, 1600) and a data synchronization device 1100. As shown in FIG. 9, the process 900 for data synchronization may include the following operations.

In 910, a first acquisition signal may be sent to a first sensor at a preset frequency in response to an interrupt signal. The first acquisition signal may instruct the first sensor to output the first acquired data. The first sensor may start to acquire the first acquired data after the first delay. The first sensor may be an image sensor. The first delay may be the total duration between the image sensor receiving the first acquisition signal and starting to acquire effective pixels. The time interval between the image frames of the image sensor may be greater than or equal to the data solution output time of the second sensor.

In 920, after the first acquisition signal is sent to the first sensor, a second acquisition signal may be sent to a second sensor after a first delay. The second acquisition signal may instruct the second sensor to output the second acquired data. The second sensor may acquire the second acquired data in real time.

In 930, after the first acquisition signal is sent to the first sensor, a reception signal may be sent to a coprocessor after a second delay. The reception signal may instruct the coprocessor to receive and fuse the first acquired data sent by the first sensor and the second acquired data sent by the second sensor. The second delay may be the duration required by the image sensor acquiring one frame of image.

In some embodiments, the first sensor may be an image sensor. The second sensor may be an IMU/GPS integrated device, for example, u-blox M8U. One of the core problems of time synchronization is sampling alignment. Alignment needs to eliminate the inherent delay of sampling by the first sensor (e.g., 150, 250, 650, 750) (e.g., camera) and the uncertain delay caused by software processing. If the second sensor (e.g., 160, 260, 660, 760) (e.g., IMU/GPS) notifies the first sensor (e.g., image sensor) to sample and at the same time, the interrupt signal output (e.g., interrupt signal output 630, interrupt signal output 730) is notified to generate an interrupt signal and send it to the coprocessor (e.g., CPU) for receiving image data, only one an interrupt signal is received and only one frame of data is received from the perspective of software. However, due to the lack of relevant information (for example, the image sensor includes a hardware counter that may be configured to correlate the time of the IMU/GPS), it is still unable to associate the image data with the IMU/GPS data. Therefore, a built-in hardware counter or the image sensor module that can fuse time information in the image may be needed, or hardware frequency rise may be needed for insufficient IMU/GPS output frequency, to completely eliminate the impact of software processing.

The present disclosure may apply hardware frequency rising to solve the above problem. In response to the interrupt signal, in 910, the first acquisition signal is sent to the first sensor at a preset frequency, to realize the frequency raising. By sending the first acquisition signal to the first sensor at a preset frequency (i.e. at a certain interval), performing operations 920 and 930 in turn, a plurality of synchronous first acquired data and second acquired data may be obtained between the two interrupt signals.

Figure 10:
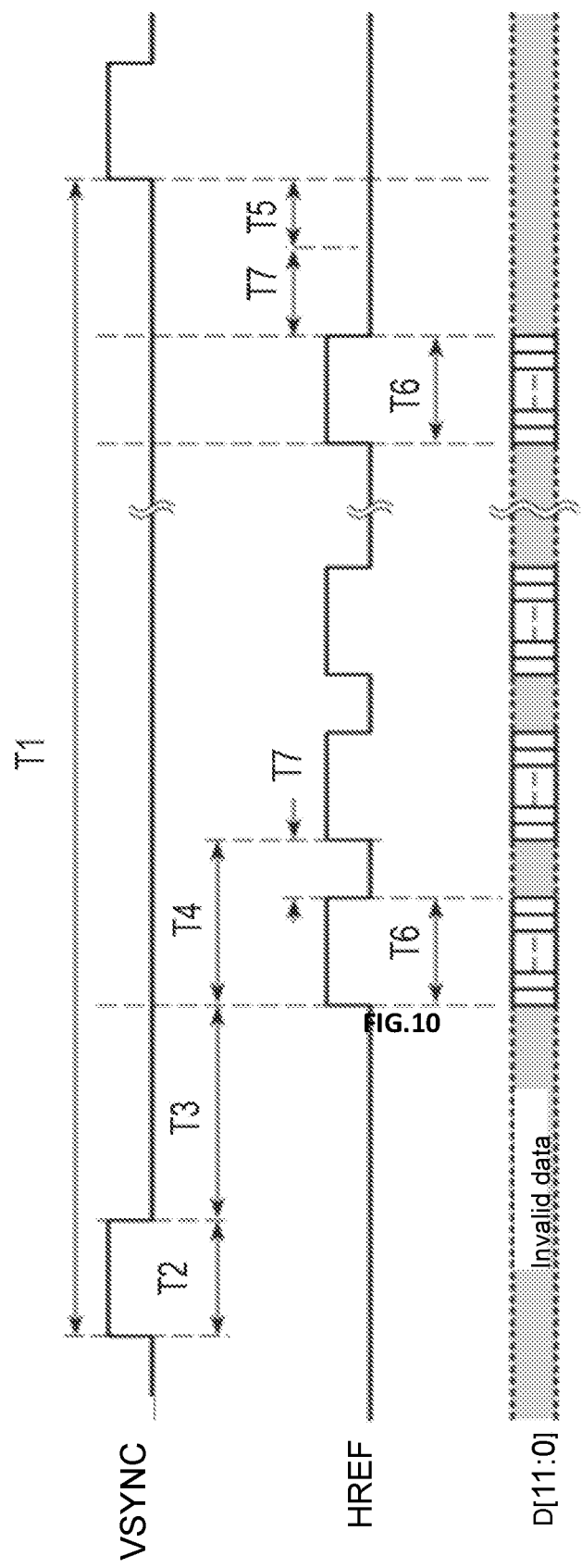
FIG. 10 is an output sequence diagram illustrating a CMOS image sensor according to some embodiments of the present disclosure.

FIG. 10 is an output sequence diagram illustrating a CMOS image sensor according to some embodiments of the present disclosure. FIG. 10 may be used to explain the inherent delay of the CMOS image sensor. As shown in FIG. 10, T1 is the duration required by the CMOS image sensor for acquiring one frame of image (if the frame rate is 25 fps, the duration for acquiring one frame of image is 40 milliseconds). T2 is the Blank Time, that is, the duration that the VSync (Vertical Sync) signal is inactive. T3 is the duration from the VSync signal to HREF, that is, the duration from the falling edge of the Vsync signal to the beginning of acquiring effective pixels (Start Time). T3 may be used to reset the potential well. T3 may also include the duration for acquiring dummy lines. T4 is the duration for acquiring a whole row of data. T6 is the acquisition duration of the active pixel in the row of data. T7 is the horizontal blanking duration after the data acquisition of the row of data. After the data acquisition of the last row, there is a T5, that is, the duration from HREF to VSync signal. T5+T7 is called end time.

The second sensor may be an IMU/GPS integrated device. To strictly align the image acquisition time of the CMOS image sensor with the time of IMU/GPS, it is necessary to use the time of exposure start (i.e. the start time of T4) rather than the start time of frame (i.e. the start time of T2) as the time when IMU/GPS starts to acquire data. Therefore, this inherent delay (i.e. T2+T3) needs to be considered for IMU/GPS data acquisition. The duration of T2+T3 is the total duration of the image sensor from receiving the first acquisition signal to starting the acquisition of effective pixels, that is, the first delay. In some embodiments, the inherent delay may be determined according to the setting of the register of the CMOS image sensor actually used, or by accurate measurement.

In addition, it takes time for some second sensors (such as IMU/GPS integrated equipment) to solve the data. Therefore, the frame rate of the first sensor cannot be too large, and the time between two adjacent frames should cover the data solution duration of the second sensor. For example, if the second sensor is M8U, the duration required for its solution is about 75 milliseconds. Therefore, the frame rate of the first sensor needs to cover at least 75 milliseconds to ensure that the time when the first sensor acquires image data is the same as that of the signal output by the second sensor. For example, the frame rate of the first sensor may be 10 fps. In this way, the interval between each frame may be 100 milliseconds, and the duration of 100 milliseconds may be enough to ensure the data solution of the second sensor. In this case, as long as the sampling of the first sensor and the second sensor is triggered synchronously, the data acquired by the subsequent first sensor and the second sensor can be output synchronously.

Because the first sensor has requirements on the time length when acquiring the image frame, therefore, the fusion of coprocessor cannot start until the acquisition of the image data is finished. Therefore, the reception signal sent to the coprocessor needs to wait for the second delay, that is, the duration for the image sensor to acquire one frame of image.

The methods and systems of the present disclosure may ensure the synchronization of data acquisition and fusion by setting different delays, and increase the count of data acquisition by increasing the frequency, to completely eliminate the impact of software processing.

Figure 11:
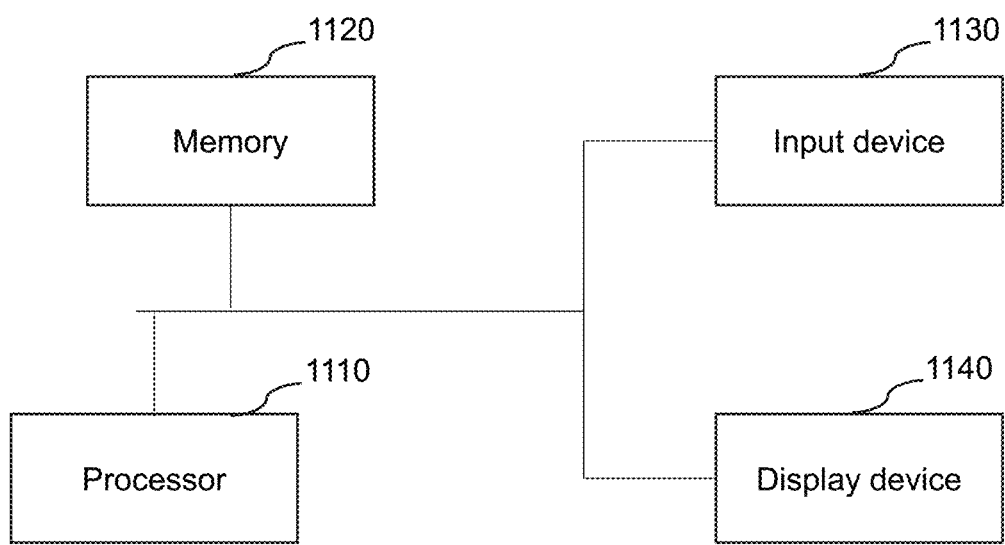
FIG. 11 is a schematic diagram illustrating components of a data synchronization device according to some embodiments of the present disclosure.

FIG. 11 is a schematic diagram illustrating the components of a data synchronization device 1100 shown according to some embodiments of the present disclosure. The data synchronization device 1100 may perform the processes for data synchronization provided in the present disclosure (e.g., the process 800 for data synchronization and/or the process 900 for data synchronization). As shown in FIG. 11, the data synchronization device 1100 may include at least one processor 1110 and a memory 1120 connected in communication with at least one processor 1110.

The memory 1120 may store instructions that can be executed by at least one processor 1110. The instructions may be executed by the at least one processor 1110 to enable the at least one processor 1110 to execute the exemplary process for data synchronization provided in the present disclosure (e.g., 800, 900). The data synchronization device 1100 may be a microcontroller, for example, an STM32 microcontroller. For example, FIG. 11 shows only one processor 1110 that is merely provided for illustration, and not intended to limit the scope of the present disclosure. It is understood that the data synchronization device 1100 may include more than one processor.

In some embodiments, the memory 1120 may be a nonvolatile computer-readable storage medium. The nonvolatile computer-readable storage medium may be configured to store nonvolatile software programs, nonvolatile computer-executable programs, and modules, for example, program instructions/modules corresponding to the process for data synchronization (e.g., 800, 900) in the embodiments of the present disclosure. The processor 1110 may execute various functional applications and data processing by running nonvolatile software programs, instructions, and modules stored in the memory 1120, that is, realize the process for data synchronization (e.g., 800, 900) provided in the present disclosure.

In some embodiments, one or more modules may be stored in the memory 1120 to execute the process for data synchronization (e.g., 800, 900) provided in the present disclosure when executed by at least the processor 1110.

In some embodiments, memory 1120 may include a storage program area and a storage data area. The storage program area may store the operating system and present disclosure programs required to implement the process for data synchronization (e.g., 800, 900) provided in the present disclosure. The storage data area may store information and data generated during the implementation of the process for data synchronization provided in the present disclosure. The memory 1120 may include high-speed random access memory and nonvolatile memory. For example, the nonvolatile memory may include at least one disk storage device, a flash memory device, or another nonvolatile solid-state memory device. In some embodiments, the memory 1120 may include a memory remotely set relative to processor 1110. The remote memory may be connected to a data synchronization device (e.g., 100, 200, 600, 700, 1600) that performs the exemplary process for data synchronization provided by the present disclosure through a network. The network may include but is not limited to, the internet, an enterprise intranet, a local area network, a mobile communication network, etc., and any combination thereof.

The data synchronization device 1100 may also include an input device 1130 and a display device 1140. The processor

1110, the memory 1120, the input device 1130, and the display device 1140 may be connected through a bus or other means. In FIG. 11, the bus connection is taken as an example that is merely provided for illustration, and not intended to limit the scope of the present disclosure.

The input device 1130 may receive clicks inputted by a user and generate signal inputs related to user settings and function control related to the process for data synchronization (e.g., 800, 900) provided in the present disclosure. The display device 1140 may include a display device such as a display screen.

Figure 12:
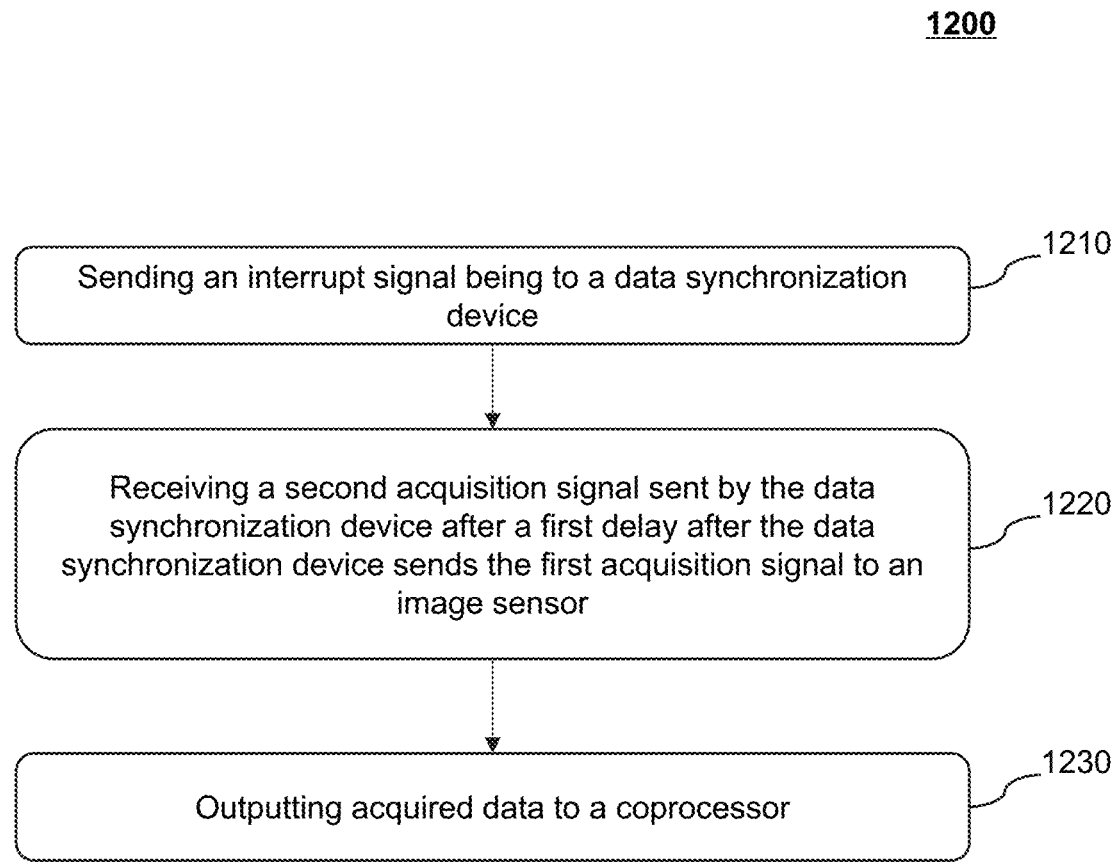
FIG. 12 is a flowchart illustrating an exemplary process for data synchronization implemented on at least one sensor according to some embodiments of the present disclosure.

FIG. 12 is a flowchart illustrating an exemplary process 1200 for data synchronization implemented on at least one sensor (e.g., a second sensor) according to some embodiments of the present disclosure. As shown in FIG. 12, the process 1200 for data synchronization may include following operations.

In 1210, an interrupt signal may be sent to a data synchronization device (e.g., data synchronization device 1100) by at least one sensor (e.g., a second sensor).

In 1220, the at least one sensor (e.g., a second sensor) may receive a second acquisition signal sent by the data synchronization device after the first delay after the data synchronization device sends a first acquisition signal to an image sensor. The first delay may be the total duration between the time the image sensor receives the first acquisition signal and the time the image sensor starts to acquire effective pixels.

In 1230, acquired data may be output to the coprocessor by the at least one sensor (e.g., a second sensor).

The method may be performed on a second sensor, for example, an IMU/GPS integrated device, such as u-Blox M8U. The second sensor may perform the process 1200 for data synchronization described above. The present disclosure solves the problem that the sampling times between multiple sensors are not synchronized by adopting the delayed trigger for the sensor, and realizes the synchronous sampling between at least two sensors.

Figure 13:
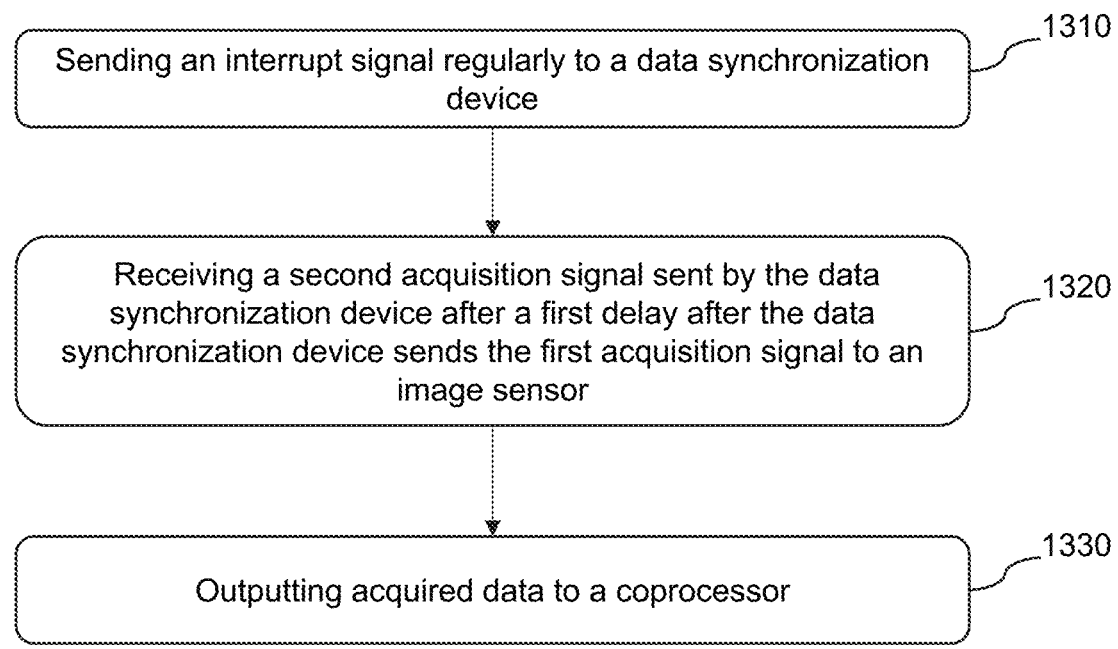
FIG. 13 is a flowchart illustrating an exemplary process for data synchronization implemented on at least one sensor according to some embodiments of the present disclosure.

FIG. 13 is a flowchart illustrating performing process 1300 for data synchronization implemented on at least one sensor (e.g., a second sensor) according to some embodiments of the present disclosure. As shown in FIG. 13, the process 1300 for data synchronization may include the following operations.

In 1310, an interrupt signal regularly may be sent to the data synchronization device (e.g., data synchronization device 1100) by at least one sensor (e.g., a second sensor).

In 1320, the at least one sensor (e.g., a second sensor) may receive a second acquisition signal sent by the data synchronization device after the first delay after the data synchronization device sends a first acquisition signal to an image sensor. The first delay may be the total duration between the time when the image sensor receives the first acquisition signal and the time when the image sensor starts to acquire effective pixels.

In 1330, acquired data may be outputted to a coprocessor by the at least sensor.

Figure 14:
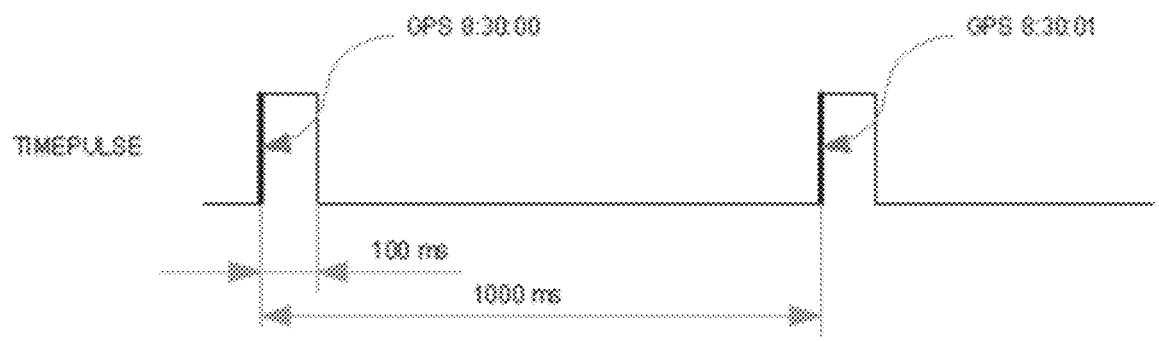
FIG. 14 is a schematic diagram illustrating components of an electronic device according to some embodiments of the present disclosure.

One of the core issues of time synchronization is the starting time alignment. The present embodiment is performed by using a second sensor (e. G., IMU/GPS) to trigger the sampling of the first sensor (e. g., camera). At the same time, the cumulative error is eliminated by the timing retrigger. For example, a Pulse Per Second (PPS) is used to control the image sensor to take pictures. The pulse may be raised to a higher frequency. For example, the frequency may be increased to 5 Hz, 10 Hz, etc. The pulse may control the image sensor to take pictures at this frequency. For example, as shown in FIG. 14, an interrupt signal (TIMEPLUS) is sent every 1000 milliseconds. In this embodiment, the cumulative error is eliminated by sending an interrupt signal periodically.

Figure 15:
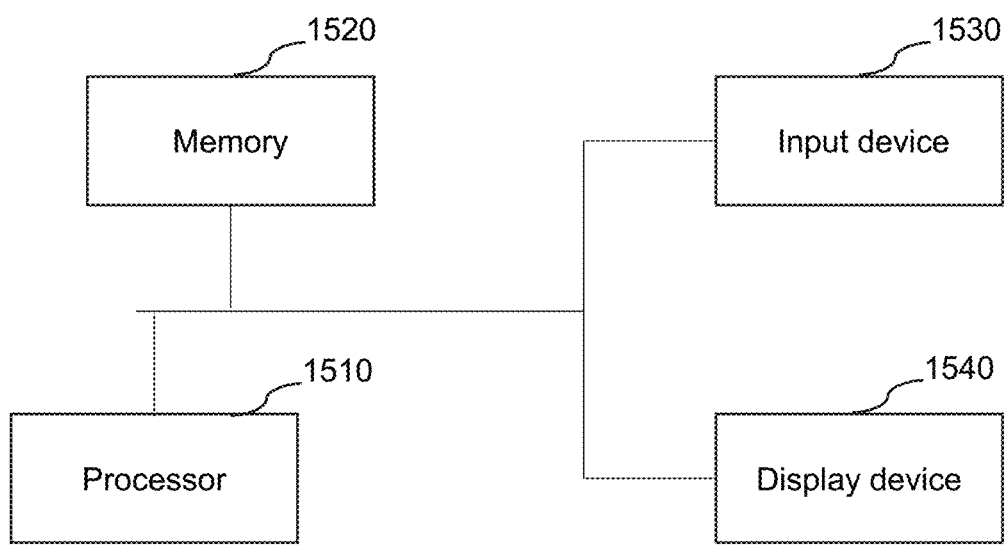
FIG. 15 is a schematic diagram illustrating an interrupt signal according to some embodiments of the present disclosure.

FIG. 15 is a schematic diagram illustrating the components of a sensor 1500 according to some embodiments of the present disclosure. The sensor 1500 may perform the processes for data synchronization provided in the present disclosure (e.g., 1200, 1300). As shown in FIG. 15, the sensor 1500 may include at least one processor 1510 and a memory 1520 connected in communication with at least one processor 1510.

The memory 1520 may store instructions that can be executed by at least one processor 1510. The instructions may be executed by the at least one processor 1110 to enable the at least one processor 1510 to execute the exemplary process for data synchronization provided in the present disclosure (e.g., 1200, 1300). The sensor 1500 may be a second sensor, for example, an IMU/GPS integrated device, such as an u-Blox M8U. For example, FIG. 15 shows only one processor 1510 that is merely provided for illustration, and not intended to limit the scope of the present disclosure. It is understood that the data synchronization device 1100 may include more than one processor.

In some embodiments, the memory 1520 may be a non-volatile computer-readable storage medium. The non-volatile computer-readable storage medium may be configured to store nonvolatile software programs, nonvolatile computer-executable programs, and modules, for example, program instructions/modules corresponding to the process for data synchronization (e.g., 1200, 1300) in the embodiments of the present disclosure. The processor 1510 may execute various functional applications and data processing by running nonvolatile software programs, instructions, and modules stored in the memory 1520, that is, realize the process for data synchronization (e.g., 1200, 1300) provided in the present disclosure.

In some embodiments, one or more modules may be stored in the memory 1520 to execute the process for data synchronization provided in the present disclosure (e.g., 1200, 1300) when executed by at least the processor 1510.

In some embodiments, the memory 1520 may include a storage program area and a storage data area. The storage program area can store the operating system and present disclosure programs required to implement the process for data synchronization (e.g., 1200, 1300) provided in the present disclosure. The storage data area can store information and data generated during the implementation of the process for data synchronization provided in the present disclosure. The memory 1520 may include high-speed random access memory and nonvolatile memory. For example, the nonvolatile memory may include at least one disk storage device, a flash memory device, or other non-volatile solid-state memory devices. In some embodiments, the memory 1520 may include a memory remotely set relative to processor 1510. The remote memory may be connected to a data synchronization device (e.g., 100, 200, 600, 700, 1600) that performs the process for data synchronization provided by the present disclosure through a network. The network may include but is not limited to, the internet, an enterprise intranet, a local area network, a mobile communication network, etc., and any combination thereof.

The sensor 1500 may also include an input device 1530 and a display device 1540. The processor 1510, the memory 1520, the input device 1530, and the display device 1540 may be connected through a bus or other means. In FIG. 15, the bus connection is taken as an example that is merely provided for illustration, and not intended to limit the scope of the present disclosure.

The input device 1530 may receive clicks inputted by a user and generate signal inputs related to user settings and function control of the process for data synchronization (e.g., 1200, 1300) provided in the present disclosure. The display device 1540 may include a display device such as a display screen.

Figure 16:
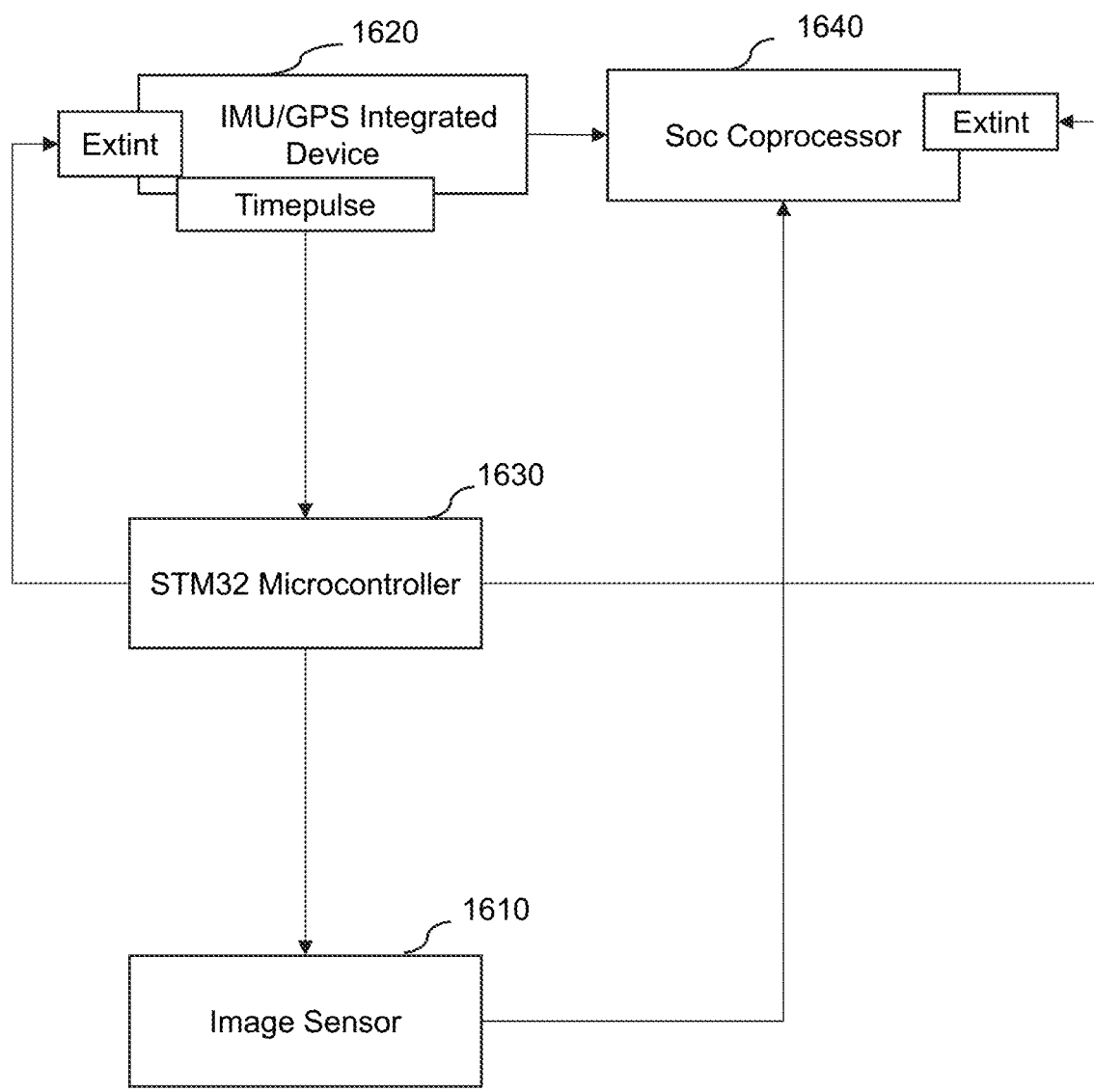
FIG. 16 is a schematic diagram illustrating an exemplary data synchronization system according to some embodiments of the present disclosure.

FIG. 16 is a schematic diagram illustrating an exemplary data synchronization system 1600 according to some embodiments of the present disclosure. As shown in FIG. 16, the data synchronization system 1600 includes an image sensor 1610 (camera), an IMU/GPS integrated device 1620, an STM32 microcontroller 1630, and an SoC (System On Chip) coprocessor 1640.

The IMU/GPS integrated device 1620 may send IMU/GPS data to the SoC coprocessor 1640 through a serial port at the rate of 10 Hz. At the same time, the TimePulse pin on the IMU/GPS integrated device 1620 may output a 1 pps trigger signal using a clock homologous to the IMU/GPS. The trigger signal may be used as a reference signal to calibrate the time per second.

The STM32 microcontroller 1630 may increase the frequency of 1 Hz signal output by the TimePulse pin to 10 Hz signal, and output signals in two ways. The two signals may have an appropriate delay between each other and the two signals may be used to trigger the external interrupt (Extint) of the image sensor 1610 and the IMU/GPS integrated device 1620, respectively. It should be noted that since there is a certain delay between the exposure starting time of the image sensor 1610 and the time when the IMU/GPS integrated device 1620 calculates and outputs data, it is necessary to accurately adjust the delay of the STM32 microcontroller 1630 to ensure that the exposure starting time of the image sensor 1610 is synchronized with the output signal of the IMU/GPS integrated device 1620. It should be noted that if the IMU/GPS integrated device 1620 is M8U, the duration required for the data solution is about 75 milliseconds. Therefore, the frame rate of the image sensor 1610 cannot be too large, and it is necessary to cover a delay of at least 75 milliseconds to ensure that the photographing of the image sensor 1610 may be synchronized with the signal output of IMU/GPS. For example, the frame rate of the image sensor 1610 may be 10 fps, so that the time interval between each frame of images of the image sensor 1610 is 100 milliseconds. In this case, as long as synchronous trigger sampling is ensured, 100 milliseconds is enough to output synchronized IMU/GPS data and image data.

Figure 17:
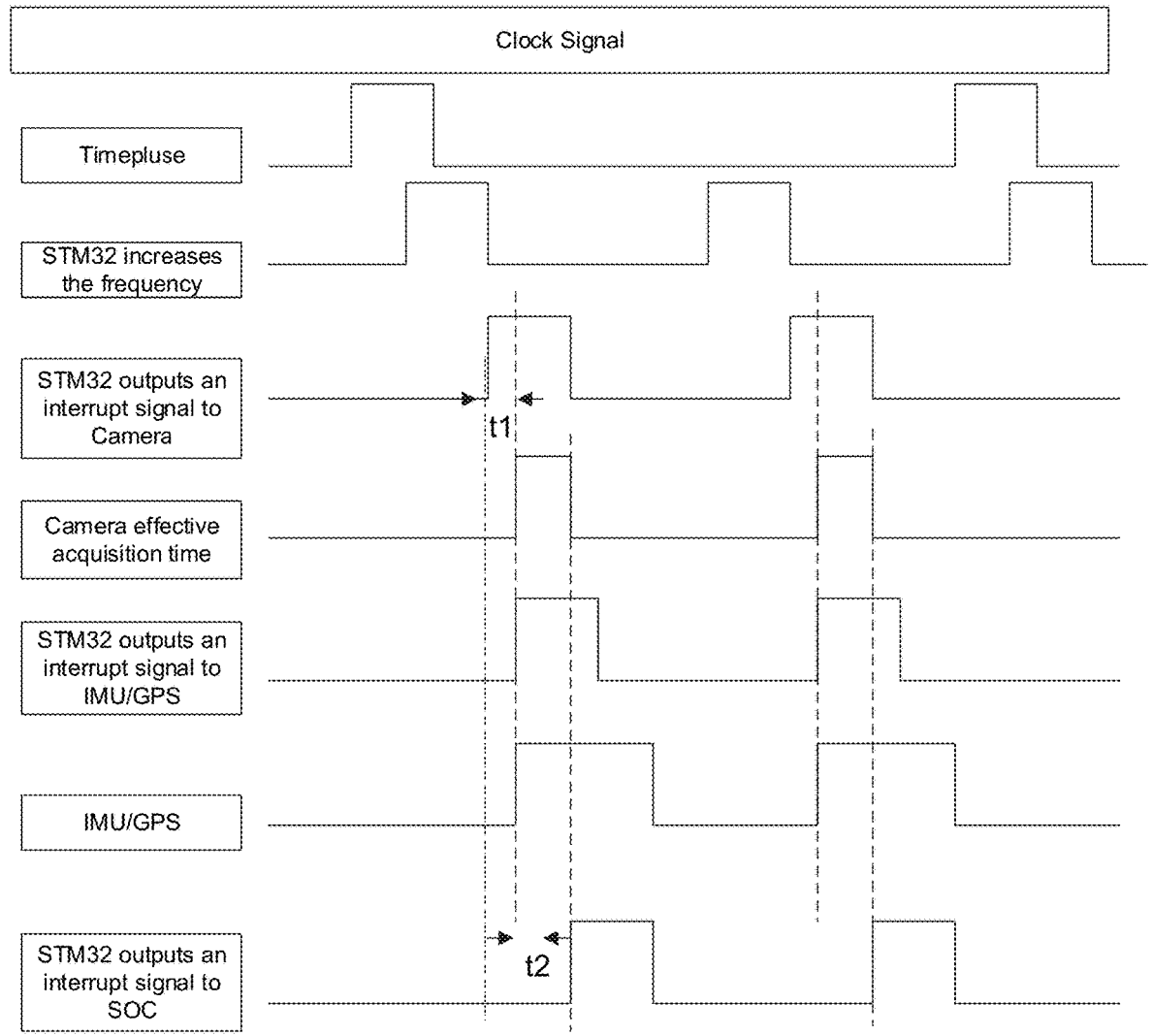
FIG. 17 is a working sequence diagram illustrating a data synchronization system according to some embodiments of the present disclosure.

In addition, if BT656 (a video signal sending standard) output is used between the image sensor 1610 and the SoC coprocessor 1640, serial-parallel conversion may be involved. In this way, if the frame rate of the image sensor 1610 is low, the required pixel clock (PCLK) may be very low, which may cause the pixel clock to fail to match the operating frequency of a serial-parallel conversion device. For example, if the serial-parallel converter adopts Ti933, the pixel clock may be required to be between 37.5 mHz and 100 mHz. The pixel clock required for the output of 720p pixels is 1650*750*10*2=24.75 MHz. In this case, the image sensor 1610 may not output synchronous photographic pictures (i.e., images) at the frequency of 10 Hz. The overall working sequence diagram may be shown in FIG. 17. It should be noted that the timing shown in FIG. 17 is not accurate timing, and FIG. 17 is only a schematic diagram to illustrate that the image sensor 1610 and the IMU/GPS integrated device 1620 may accurately synchronize the output data under the control of the TimePulse/STM32 microcontroller 1630. As illustrated in FIG. 16, the TimePulse pin of the IMU/GPS integrated device 1620 may output a 1 pps trigger signal using a clock homologous with the IMU/GPS integrated device 1620. The STM32 microcontroller 1630 may increase the frequency of 1 Hz signal output by TimePulse pin to generate a pulse signal of 10 Hz. The STM32 microcontroller 1630 may send a data acquisition instruction (i.e. pulse signals) to the image sensor 1610 at a frequency of 10 Hz. When the image sensor 1610 receives the data acquisition instruction, the image sensor 1610 may be triggered to perform data acquisition. Due to the inherent delay (i.e. the preparation duration before starting acquisition (i.e. t1)) of the image sensor 1610, the time when the image sensor 1610 starts to effectively acquire data is later than the time when the data acquisition instruction is received. The STM32 microcontroller 1630 may send a data acquisition instruction (i.e. Pulse signal) to the IMU/GPS integrated device 1620 at a frequency of 10 Hz after t1. After a certain delay, the image sensor 1610 and the IMU/GPS integrated device 1620 may acquire data synchronously. The STM32 microcontroller 1630 may send data receiving instructions (i.e. pulse signals) to SoC coprocessor 1640 at a frequency of 10 Hz after a certain delay (i.e. t2). After t2 delay, the data acquired by the image sensor 1610 and the IMU/GPS integrated device 1620 may be synchronously sent to the SoC coprocessor 1640 for data fusion.

Test and Verification

The purpose of the test is to verify the synchronization accuracy that the data synchronization system provided in the present disclosure can achieve. According to an embodiment, the test was performed by capturing images of an oscilloscope waveform by the image sensor 1610. An oscilloscope was triggered by a pulse generated by the IMU/GPS integrated device 1620. The oscilloscope was delayed according to the process for data synchronization provided in the present disclosure. The duration for a square wave generated by the oscilloscope is the exposure duration. The synchronization accuracy may be accurately judged according to the starting position of the square wave of the oscilloscope. If the starting position of the square wave of the photographing oscilloscope is the trigger position, it instructs that the delay between the photographing of the IMU/GPS integrated device 1620 and the image sensor 1610 is 0. If the starting position is in the middle of the wave crest, it is clear that the delay between image acquisition of the IMU/GPS integrated device 1620 and the image sensor 1610 is half of the wave crest time.

An embodiment of the present disclosure provides a storage medium. The storage medium may store computer instructions. When the computer executes the computer instruction, the process for data synchronization provided in the present disclosure may be executed (e.g., 800, 900, 1200, 1300).

The embodiment of the present disclosure provides a data synchronization device, which includes a processor and a memory. The memory may be configured to store instructions, and the processor may be configured to execute the instructions to execute the process for data synchronization provided in the present disclosure (for example, 800, 900, 1200, 1300).

An embodiment of the present disclosure provides a vehicle. The vehicle may include a vehicle body. The vehicle body may be provided with a data synchronization system (such as 100, 200, 600, 700, 1600) provided in the present disclosure.

The embodiment of present disclosure also provides a computer-readable storage medium. The storage medium may store computer instructions. When the computer instructions are executed by the processor, the operation corresponding to the process for data synchronization described in the present disclosure may be realized.

The possible beneficial effects of the embodiment of present disclosure include but are not limited to: (1) by setting the first delay, it is ensured that the information at the same time point is acquired at the same time; (2) by setting the second delay, the simultaneous receiving of data is ensured; (3) the frequency upgrade improves the acquisition efficiency and ensures that the acquisition can be completed within a limited time. It should be noted that different embodiments may produce different beneficial effects. In different embodiments, the possible beneficial effects may be any one or a combination of the above or any other possible beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

At the same time, the present disclosure uses specific words to describe the embodiments of the present disclosure. For example, "one embodiment", "one embodiment", and/or "some embodiments" mean a feature, structure, or feature related to at least one embodiment of the present disclosure. Therefore, it should be emphasized and noted that "one embodiment" or "one embodiment" or "an alternative embodiment" mentioned twice or more in different positions in the present disclosure do not necessarily refer to the same embodiment. In addition, some features, structures, or features in one or more embodiments of the present disclosure may be combined appropriately.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, an installation on an existing server or mobile device.

Similarly, it should be appreciated that in the foregoing description of embodiments of the present disclosure, various features are sometimes grouped in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the disclosure are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the disclosure are approximations, the numerical values set forth in the specific examples are reported as precisely as practicable.

Each of the patents, patent disclosures, publications of patent disclosures, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the disclosure disclosed herein are illustrative of the principles of the embodiments of the disclosure. Other modifications that may be employed may be within the scope of the disclosure. Thus, by way of example, but not of limitation, alternative configurations of the embodiments of the disclosure may be utilized in accordance with the teachings herein. Accordingly, embodiments of the present disclosure are not limited to that precisely as shown and described.

What is claimed is:

1. A system, comprising:
    at least one storage device storing executable instruction, and
    at least one processor in communicating with the at least one storage device, wherein when executing the executable instruction, the processor causes the system to perform operations, including:
        receiving a first instruction, the first instruction being used to instruct a start of data acquisition of the system;
        in response to receiving the first instruction, generating a second instruction, the second instruction being used to trigger a first sensor and a second sensor to acquire data; and
        sending the second instruction to the first sensor and the second sensor respectively based on a first delay, the first delay causing a time difference between the first sensor and the second sensor starting to acquire data less than a first preset threshold, wherein the first sensor is an image sensor, the first delay being a total duration between the image sensor receiving the second instruction and starting to acquire image frames, and a time interval between the image frames of the image sensor is greater than or equal to a data solution output time of the second sensor,
        wherein in response to receiving the first instruction, the operations further include:
        generating a third instruction, the third instruction being used to instruct the first sensor and the second sensor to send acquired data; and
        sending the third instruction to the first sensor and the second sensor respectively based on a second delay, the second delay causing a time difference between the first sensor and the second sensor sending the acquired data less than a second preset threshold.

2. The system of claim 1, wherein in response receiving the first instruction, the sending the second instruction to the first sensor and the second sensor respectively based on the first delay includes:
    sending a first acquisition instruction to the first sensor, the first acquisition instruction being used to trigger the first sensor to acquire data; and
    after the first delay, sending a second acquisition instruction to the second sensor, the second acquisition instruction being used to trigger the second sensor to acquire data.

3. The system of claim 2, wherein the receiving a first instruction includes:
    receive the first instruction sent by the second sensor at a second frequency.

4. The system of claim 2, wherein a duration for the first sensor to acquire data is longer than a duration for the second sensor to acquire data.

5. The system of claim 1, wherein in response to receiving the first instruction, the sending the second instruction to the first sensor and the second sensor respectively based on the first delay includes:
    sending a first acquisition instruction to the first sensor, the first acquisition instruction being used to trigger the first sensor to acquire data; and
    sending a second acquisition instruction to the second sensor, the second acquisition instruction being used to trigger the second sensor to acquire data, the second acquisition instruction including the first delay.

6. The system of claim 1, wherein the sending the third instruction to the first sensor and the second sensor based on the second delay includes:
    in response to receiving the first instruction, sending a first sending instruction to the first sensor, the first sending instruction being used to instruct the first sensor to send acquired data; and
    after the second delay, sending a second sending instruction to the second sensor, the second sending instruction being used to instruct the second sensor to send acquired data.

7. The system of claim 1, wherein the second delay is related to a frequency of sending the first instruction.

8. The system of claim 1, wherein the second sensor includes a positioning sensor and the second delay is determined based on a length of time for the image sensor to acquire one frame of image data.

9. The system of claim 1, the operations further comprising:
    in response to receiving the first instruction,
    generating a third instruction, the third instruction being used to instruct to obtain the data acquired by the first sensor and the second sensor; and
    obtaining the acquired data based on the third instruction and process the acquired data, the third instruction including a second delay.

10. The system of claim 1, wherein the sending the second instruction to the first sensor and the second sensor respectively based on a f first delay includes:
    sending the second instruction based on a first frequency.

11. The system of claim 1, wherein the second instruction includes a third instruction for obtaining the data acquired by the first sensor and the second sensor.

12. The system of claim 1, wherein the first delay is related to preparation durations of the first sensor and the second sensor for acquiring data.

13. A method, comprising:
receiving a first instruction, the first instruction being used to instruct a start of data acquisition of the system;
in response to receiving the first instruction,
generating a second instruction, the second instruction being used to trigger a first sensor and a second sensor to acquire data;
generating a third instruction, the third instruction being used to instruct the first sensor and the second sensor to send acquired data
sending the second instruction to the first sensor and the second sensor respectively based on a first delay, the first delay causing a time difference between the first sensor and the second sensor starting to acquire data less than a first preset threshold, wherein the first sensor is an image sensor, the first delay being a total duration between the image sensor receiving the second instruction and starting to acquire image frames, and a time interval between the image frames of the image sensor is greater than or equal to a data solution output time of the second sensor; and
sending the third instruction to the first sensor and the second sensor respectively based on a second delay, the second delay causing a time difference between the first sensor and the second sensor sending the acquired data less than a second preset threshold.

14. The method of claim 13, wherein,
in response to receiving the first instruction, the sending the second instruction to the first sensor and the second sensor respectively based on the first delay includes:
sending a first acquisition instruction to the first sensor, the first acquisition instruction being used to trigger the first sensor to acquire data; and
after the first delay, sending a second acquisition instruction to the second sensor, the second acquisition instruction being used to trigger the second sensor to acquire data.

15. The method of claim 13, wherein,
in response to receiving the first instruction, the sending the second instruction to the first sensor and the second sensor respectively based on the first delay includes:
sending a first acquisition instruction to the first sensor, the first acquisition instruction being used to trigger the first sensor to acquire data; and
sending a second acquisition instruction to the second sensor, the second acquisition instruction being used to trigger the second sensor to acquire data, the second acquisition instruction including the first delay.

16. The method of claim 13, wherein the sending the third instruction to the first sensor and the second sensor based on the second delay includes:
in response to receiving the first instruction,
sending a first sending instruction to the first sensor, the first sending instruction being used to instruct the first sensor to send acquired data; and
after the second delay, send a second sending instruction to the second sensor, the second sending instruction being used to instruct the second sensor to send acquired data.

17. The method of claim 13, further comprising:
in response to receiving the first instruction,
generating a third instruction, the third instruction being used to instruct to obtain data acquired by the first sensor and the second sensor; and
obtaining the acquired data based on the third instruction and processing the acquired data, the third instruction including a second delay.

* * * * *